United States Patent [19]

Futsuhara et al.

[11] Patent Number: 5,495,228
[45] Date of Patent: Feb. 27, 1996

[54] FAIL-SAFE SCAN CIRCUIT AND A MULTIBEAM SENSOR

[75] Inventors: Koichi Futsuhara; Masakazu Kato, both of Urawa, Japan

[73] Assignee: The Nippon Signal Co., Ltd., Tokyo, Japan

[21] Appl. No.: 91,136

[22] Filed: Jul. 14, 1993

[30] Foreign Application Priority Data

Jul. 15, 1992 [JP] Japan .................................. 4-188343
Feb. 19, 1993 [JP] Japan .................................. 5-030068

[51] Int. Cl.⁶ .................................................. G08B 29/00
[52] U.S. Cl. ......................... 340/507; 340/518; 364/138; 364/140
[58] Field of Search ................................ 340/507, 506, 340/518; 364/140, 136, 138; 371/14, 15.1, 29.5

[56] References Cited

U.S. PATENT DOCUMENTS

| | | | |
|---|---|---|---|
| 3,970,846 | 7/1976 | Schofield et al. | 250/221 |
| 4,309,696 | 1/1982 | Nagai et al. | 340/518 |
| 4,414,539 | 11/1983 | Armer | 340/507 |
| 4,528,553 | 7/1985 | Hastings et al. | 340/507 |
| 4,607,252 | 8/1986 | Neri | 340/507 |
| 4,661,880 | 4/1987 | Futsuhara | 361/93 |
| 4,667,184 | 5/1987 | Futsuhara | 340/507 |
| 4,682,153 | 7/1987 | Boozer et al. | 340/507 |
| 4,757,417 | 7/1988 | Futsuhara | 361/86 |

FOREIGN PATENT DOCUMENTS 4-00631 5/1992 Japan.
WO90/08333 7/1990 WIPO.

Primary Examiner—John K. Peng
Assistant Examiner—Daniel J. Wu
Attorney, Agent, or Firm—Lowe, Price, Leblanc & Becker

[57] ABSTRACT

A fail-safe scan circuit sequentially and periodically drives and scans objective devices. The scan circuit has a failure detector that provides, upon detecting a failure, a signal of logical value 0 to inform of the failure. Adjacent input signals to the failure detector have a phase difference of $\pi$. This phase difference results in simplifying the structure of the failure detector. The fail-safe scan circuit is employable to drive and scan many photosensors of a fail-safe multibeam sensor.

15 Claims, 22 Drawing Sheets

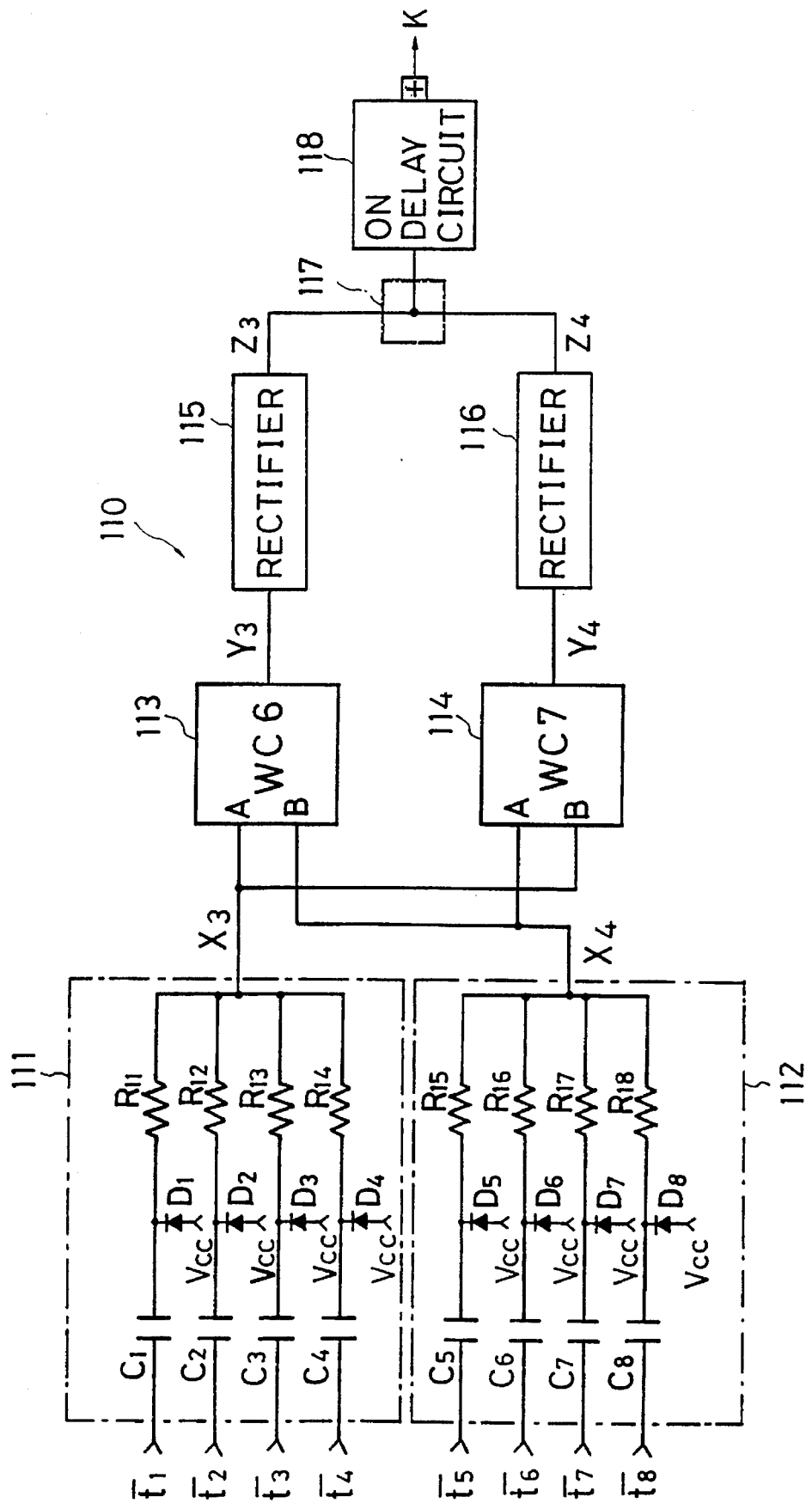

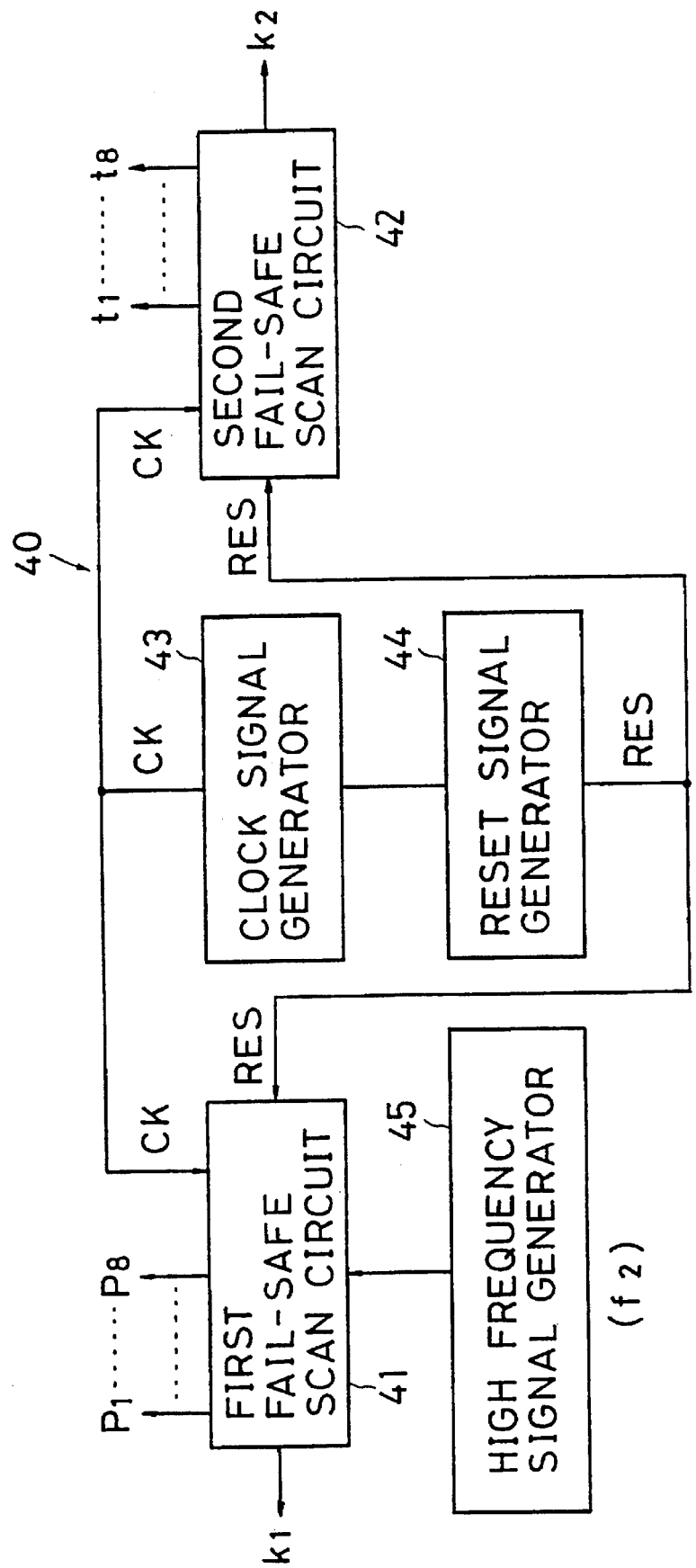

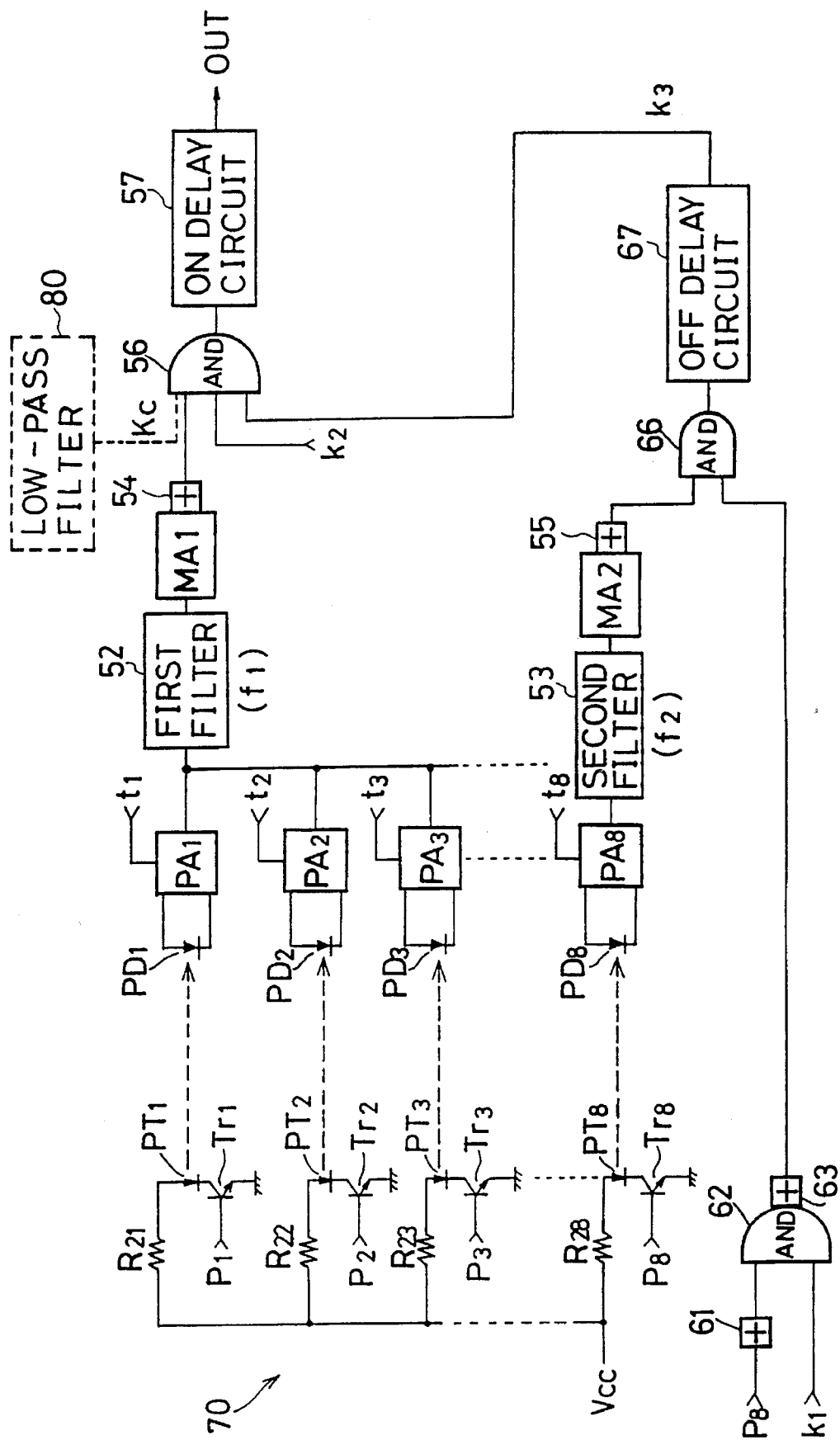

FAIL-SAFE SCAN CIRCUIT AND A MULTIBEAM SENSOR

BACKGROUND OF THE INVENTION

1. Field of the Invention

The present invention relates to a fail-safe scan circuit for sequentially and periodically driving and scanning a plurality of objects and to a fail-safe multibeam sensor.

2. Related Art of the Invention

U.S. Pat. No. 4,309,696 discloses a multibeam sensor used for securing the safety of an operator of a machine such as a press.

The press has a danger zone in which an operator must not be present during the operation of the press and a safe zone in which the operator is safe. At a boundary between the danger and safe zones, many light emitters and photodetectors are oppositely arranged. The light emitters emit beams toward the photodetectors. If the operator blocks at least one of the beams, a corresponding one of the photodetectors will not provide an output signal. Then, it is determined that the operator is in the danger zone, and the press is stopped.

The light emitters and photodetectors are vertically positioned at intervals of about, for example, two centimeters. Since any beam from the emitters more or less diffuses, the beam may be received not only by a corresponding one of the photodetectors but also by adjacent ones. In this case, several photodetectors will simultaneously provide signals in response to the beam. To avoid this, the emitters may emit beams at different frequencies, and each photodetector may have a filter that extracts only a signal of corresponding frequency. This technique, however, involves as many frequencies and filters as the light emitters and photodetectors.

To avoid an increase in the numbers of these parts, a technique has been proposed to employ a scan circuit that sequentially and periodically drives pairs of the light emitters and photodetectors one after another. Conventional scan circuits, however, are incapable of detecting abnormalities such as simultaneous emission of beams due to simultaneously generated scan signals.

Accordingly, the inventors of the present invention have proposed PCT/JP92/00631 disclosing a fail-safe scan circuit for periodically providing scan signals to objective devices. This circuit generates a signal of logical value 1 under a normal state, and upon detecting an abnormality, stops the signal.

This fail-safe scan circuit has a counter circuit for periodically counting as many pulses of a clock signal as the objective devices; a scan signal generator for consecutively generating as many scan signals as the objective devices in response to count signals provided by the counter circuit; and a fail-safe failure detector.

The failure detector provides a signal of logical value 1 representing a high energy state if the scan signals are normal and a signal of logical value 0 representing a low energy state to inform of an abnormality. The abnormality may be simultaneous generation of some of the scan signals, or a lock of at least one of the scan signals in a single scan period.

The signal of logical value 1 provided by the failure detector is used as an enable signal for starting a machine such as a press. Upon detecting an abnormality in the scan circuit, the failure detector provides the signal of logical value 0 to stop the press.

SUMMARY OF THE INVENTION

An object of the present invention is to provide an improved fail-safe scan circuit having a failure detector with simple structure.

Another object of the present invention is to provide a failure detector that provides a signal of logical value 0 corresponding to a low energy state if a scan signal generator abnormally provides scan signals and the failure detector fails.

Still another object of the present invention is to provide a fail-safe multibeam sensor employing the improved fail-safe scan circuit.

In order to accomplish the objects, the present invention provides a fail-safe scan circuit for sequentially and periodically driving and scanning objective devices, having:

a counter circuit for periodically counting as many pulses of an input clock signal as the objective devices;

a scan signal generator for consecutively generating as many scan signals as the objective devices in response to count signals provided by the counter circuit; and a fail-safe failure detector for generating a signal of logical value 1 corresponding to a high energy state if the scan signals are normal, and a signal of logical value 0 corresponding to a low energy state to indicate an abnormality if some of the scan signals overlap and/or if at least one of the scan signals is missed in a scan period.

The failure detector has:

a first detective function unit involving a first adder, for determining whether or not some of the scan signals are overlapping according to an output of the first adder, and if they are overlapping, providing a signal of logical value 0 to indicate the abnormality;

a second detective function unit for determining whether or not all scan signals to be generated in a scan period have been completely generated, and if at least one of them has not been generated, providing a signal of logical value 0 to indicate the abnormality;

an AND circuit for providing an AND of outputs of the first and second detective function units; and an On delay circuit for providing a signal of logical value 1 to indicate that the scan signals are normal a delay time, which is longer than the scan period, after receiving a signal of logical value 1 from the AND circuit.

The first adder of the first detective function unit has:

input terminals for receiving the scan signals, respectively, the scan signals being sequentially generated by the scan signal generator with any adjacent two of them having a phase difference of $\pi$;

capacitors series-connected to the input terminals, respectively, for transmitting the scan signals to an output terminal and smoothing scan signals of the next scan period;

clamp diodes provided for the capacitors, respectively, to clamp outputs of the capacitors to a predetermined voltage;

a clamp diode for clamping the output terminal to the predetermined voltage; and a smoothing capacitor for smoothing a voltage appearing at the output terminal.

The first adder doubles, rectifies, and sums up the voltages of the scan signals with a charge/discharge time constant for the voltage doubling and rectifying processes being set according to a period of a scan signal.

If the scan signal generator fails and generates abnormal scan signals, the failure detector detects the abnormality and provides a signal of logical value 0 to inform of the abnormality. Adjacent two of the scan signals to the failure detector have a phase difference of π, to simplify the structure of the first adder of the failure detector.

The scan signal generator has:

a first group of AND gates of the same number as the objective devices, for consecutively generating rectangular signals according to the count signals from the counter circuit;

a high frequency signal generator for always generating a high-frequency signal;

an inverter for inverting the high-frequency signal; and a second group of AND gates of the same number as the objective devices, a first input terminal of each of the AND gates receiving a corresponding one of the rectangular signals, a second input terminal of every other one of the AND gates receiving the high-frequency signal and a second input terminal of each of the remaining AND gates receiving the inverted high-frequency signal. Each of the AND gates of the second group provides the non-inverted or inverted high-frequency signal as a scan signal if the rectangular signal represents a logic value 1.

The first detective function unit of the failure detector has:

the first adder;

a first window comparator for providing a signal of logical value 1 if the output level of the first adder is substantially equal to the voltage doubled and rectified level of a scan signal; and a first rectifier for rectifying an output signal of the first window comparator and providing the rectified signal to the AND circuit.

The second detective function unit has:

a second adder for doubling, rectifying, and summing up the voltages of the scan signals with a charge/discharge time constant for the voltage doubling and rectifying processes being set according to a period of a complete set of the scan signals;

a second window comparator for providing a signal of logical value 1 if the output level of the second adder is substantially equal to the sum of the voltage doubled and rectified levels of the scan signals of a scan period; and a second rectifier for rectifying an output signal of the second window comparator and providing the rectified signal to the AND circuit.

The present invention provides another fail-safe scan circuit for sequentially and periodically driving and scanning objective devices, having:

a counter circuit for periodically counting as many pulses of an input clock signal as the objective devices;

a scan signal generator for consecutively generating as many scan signals as the objective devices in response to count signals provided by the counter circuit; and a fail-safe failure detector for generating a signals of logical value 1 corresponding to a high energy state if the scan signals are normal, and a signal of logical value 0 corresponding to a low energy state to indicate an abnormality if some of the scan signals overlap and/or if at least one of scan signals is missed in a scan period.

the failure detector provides the signal of logical value 0 if at least one of the scan signals is abnormal and the failure detector itself is out of order.

The failure detector has:

a group of detector-and-phase-inverter circuits of the same number as the scan signals, for detecting and phase-inverting the scan signals;

third and fourth adders for summing up the output levels of respective groups of the phase-inverted high-frequency-modulated scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value 1 only when the sums are within the respective ranges set for the third window comparator;

a third rectifier for rectifying output signals of the third and fourth window comparators and providing a signal whose level is the sum of the levels of the output signals of the third and fourth window comparators only when the output signals of the third and fourth window comparators are normal and alternating, a time constant of the third rectifier being set according to a period of a complete set of the scan signals;

a fourth rectifier for rectifying the output signals of the third and fourth window comparators and providing a signal of logical value 1 if at least one of the third and fourth window comparators provides an output signal, and a signal of logical value 0 if none of the third and fourth window comparators provide an output signal, a time constant of the fourth rectifier being set according to a period of a scan signal;

a fifth window comparator for providing a signal of logical value 1 only when the output level of the third rectifier is substantially equal to the sum of the output levels of the third and fourth window comparators and the fourth rectifier provides a signal of logical value 1; and an ON delay circuit for providing a signal of logical value 1 to indicate that the scan signals are normal a delay time, which is longer than the scan period, after receiving a signal of logical value 1 from the fifth window comparator.

Alternatively, the failure detector may have:

a group of detector-and-phase-inverter circuits of the same number as the scan signals, for detecting and phase-inverting the scan signals;

third and fourth adders for summing up the output levels of respective groups of the detected and phase-inverted scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value 1 only when the sums are within the respective ranges set for the third window comparator;

a fourth rectifier for rectifying output signals of the third and fourth window comparators and providing a signal of logical value 1 if at least one of the third and fourth window comparators provides an output signal, and a signal of logical value 0 if none of the third and fourth window comparators provide an output signal, a time constant of the fourth rectifier being set according to a period of a scan signal; and an ON delay circuit for providing a signal of logical value 1 to indicate that the scan signals are normal a delay time, which is longer than the scan period, after receiving a signal of logical value 1 from the fourth rectifier.

Alternatively, the failure detector may have:

a group of detector-and phase-inverter circuits of the same number as the scan signals, for detecting and phase-inverting the scan signals;

fifth and sixth adders each having as many input terminals as the detected and phase-inverted scan signals contained in a corresponding one of the groups of the scan signals, each of the fifth and sixth adders including circuits connected in parallel with one another between the input terminal and an output terminal, each circuit having a capacitor, a resistor connected in series with the capacitor, and a clamp diode for clamping an output of the capacitor to a predetermined voltage, each of the fifth and sixth adders providing an output signal whose voltage level is determined by the number of the scan signals applied to the input terminals of the adder;

a sixth window comparator having a first input terminal for receiving a sum provided by the fifth adder and a second input terminal for receiving a sum provided by the sixth adder, the sixth window comparator providing a signal of logical value 1 only when the sums are within respective predetermined ranges that are different from each other and are determined according to the numbers of the scan signals in the respective groups;

a seventh window comparator having a first input terminal for receiving the sum from the sixth adder and a second input terminal for receiving the sum from the fifth adder, the seventh window comparator providing a signal of logical value 1 only when the sums are within the respective ranges set for the sixth window comparator;

fifth and sixth rectifiers for rectifying output signals of the sixth and seventh window comparators, respectively, a time constant of the rectifiers being set according to a period of a scan signal;

an OR circuit for providing an OR of rectified outputs of the fifth and sixth rectifiers; and an ON delay circuit for providing a signal of logical value 1 to indicate that the scan signals are normal a delay time, which is longer than the scan period, after receiving a signal of logical value 1 from the OR circuit.

Alternatively, the failure detector may have:

a group of detector-and phase-inverter circuits of the same number as the scan signals, for detecting and phase-inverting the scan signals;

third and fourth adders for summing up the output levels of respective groups of the phase-inverted high-frequency-modulated scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value 1 only when the sums are within the respective ranges set for the third window comparator;

a fourth rectifier for rectifying output signals of the third and fourth window comparators and providing a signal of logical value 1 if at least one of the third and fourth window comparators provides an output signal, and a signal of logical value 0 if none of the third and fourth window comparators provide an output signal, a time constant of the fourth rectifier being set according to a period of a scan signal;

a group of signals processors of the same number as the high-frequency modulated scan signals, for detecting and phase-inverting the high-frequency modulated scan signals and then adding these signals to a source voltage;

an eighth window comparator for providing an output of logical value 1 when the fourth rectifier provides a signal of logical value 1 and a wired-OR of outputs of the signal processors is a logical value 1; and an ON delay circuit for providing a signal of logical value 1 to indicate that the scan signals are normal a delay time, which is longer than the scan period, after receiving a signal of logical value 1 from the eighth window comparator.

Any one of these failure detectors is capable of informing of an abnormality occurred in the fail-safe scan circuit by providing a signal of logical value 0 representing a low energy state even if the scan signal generator provides abnormal scan signals and the failure detector fails.

The present invention also provides a multibeam sensor employing:

first and second fail-safe scan circuits defined in claims 1 and 5 driven by a common clock signal;

light emitters sequentially driven by high-frequency scan signals, which are sequentially provided by the first fail-safe scan circuit, and emitting beams;

photodetectors arranged opposite to the light emitters, respectively, each of the photodetectors providing a signal of logical value 1 when receiving a beam from a corresponding one of the light emitters;

amplifiers provided for the photodetectors, respectively, for amplifying outputs of the corresponding photodetectors, the amplifiers being driven by respective rectangular signals sequentially provided by the second fail-safe scan circuit in synchronism with the scan signals from the first fail-safe scan circuit;

a first AND circuit for providing an AND of an OR of amplified outputs of the amplifiers and an output of a failure detector of the second fail-safe scan circuit; and an on delay circuit for providing a signal of logical value 1 a delay time, which is longer than a scan period of the scan signals, after receiving a signal of logical value 1 from the first AND circuit.

When the scan circuit provides normal scan signals, these signals drive the light emitters to emit beams. If all of the beams are received by the photodetectors, the ON delay circuit provides a signal of logical value 1 to indicate that no object is present in a given zone. If at least one of the beams is not received by the photodetectors, the ON delay circuit provides a signal of logical value 0 to indicate that something is present in the zone.

Even if the scan circuit is normal, the ON delay circuit will provide a signal of logical value 0 if any of the light emitters fails so that the photodetectors do not sequentially and periodically provide output signals. In this case, the ON delay circuit will continue to provide the signal of 0.

If the scan circuit fail, the first AND circuit will provide a signal of logical value 0, and therefore, the ON delay circuit will continuously provide a signal of logical value 0.

A machine that employs this multibeam sensor is set to start when the On delay circuit provides a signal of logical value 1 and stop when the ON delay circuit provides a signal of logical value 0. In this case, the multibeam sensor serves as a fail-safe man sensor to secure the safety of operators in a work space shared by the machine and operators.

It is possible to arrange a low-pass filter that provides an output signal of logical value 0 when the frequency of the common clock signal to the first and second fail-safe scan circuits exceeds a predetermined value. The output signal of the low-pass filter is provided to the first AND circuit. This arrangement monitors the speed of the clock signal and surely detects a shortage of scan signal, thereby improving the fail-safe performance of the multibeam sensor.

A scan signal provided by the first fail-safe scan circuit to the last one of the light emitters may have a different frequency from the other scan signals provided by the same scan circuit to the other light emitters. This arrangement verifies whether or not the last light emitter and a corresponding one of the photodetectors are in synchronization in every scan period.

An AND of a signal indicating whether or not the scan circuit is normal and a power source for the light emitters may be used as a power source input to the light emitters so that the light emitters are driven only when the scan circuit is normal.

The multibeam sensor may have:

a third AND circuit for providing an AND of a signal provided by the failure detector of the first fail-safe scan circuit and the last one of scan signals generated in a scan period;

a fourth AND circuit for providing an AND of an OR of amplified outputs provided by the amplifiers of the photodetectors and the last one of rectangular signals generated in the scan period by the second fail-safe scan circuit;

a fifth AND circuit for providing an AND of output signals of the third and fourth AND circuits; and an OFF delay circuit for stopping to provide a signal of logical value 1 a delay time, which is longer than the scan period, after the fifth AND circuit stops to provide a signal of logical value.

An output of the OFF delay circuit is provided to the first AND circuit. This arrangement verifies whether or not the last light emitter and corresponding photodetector are in synchronization in every scan period, without employing signals having different frequencies.

BRIEF DESCRIPTION OF THE DRAWINGS

FIG. 20 shows a fifth example of a failure detector according to the present invention;

FIG. 21 shows a scan signal generator of a first example of a multibeam sensor according to the present invention;

FIG. 25 shows a third example of a multibeam sensor according to the present invention.

DESCRIPTION OF THE PREFERRED EMBODIMENTS

A fail-safe scan circuit according to an embodiment of the present invention will be explained with reference to the drawings.

Figure 1:
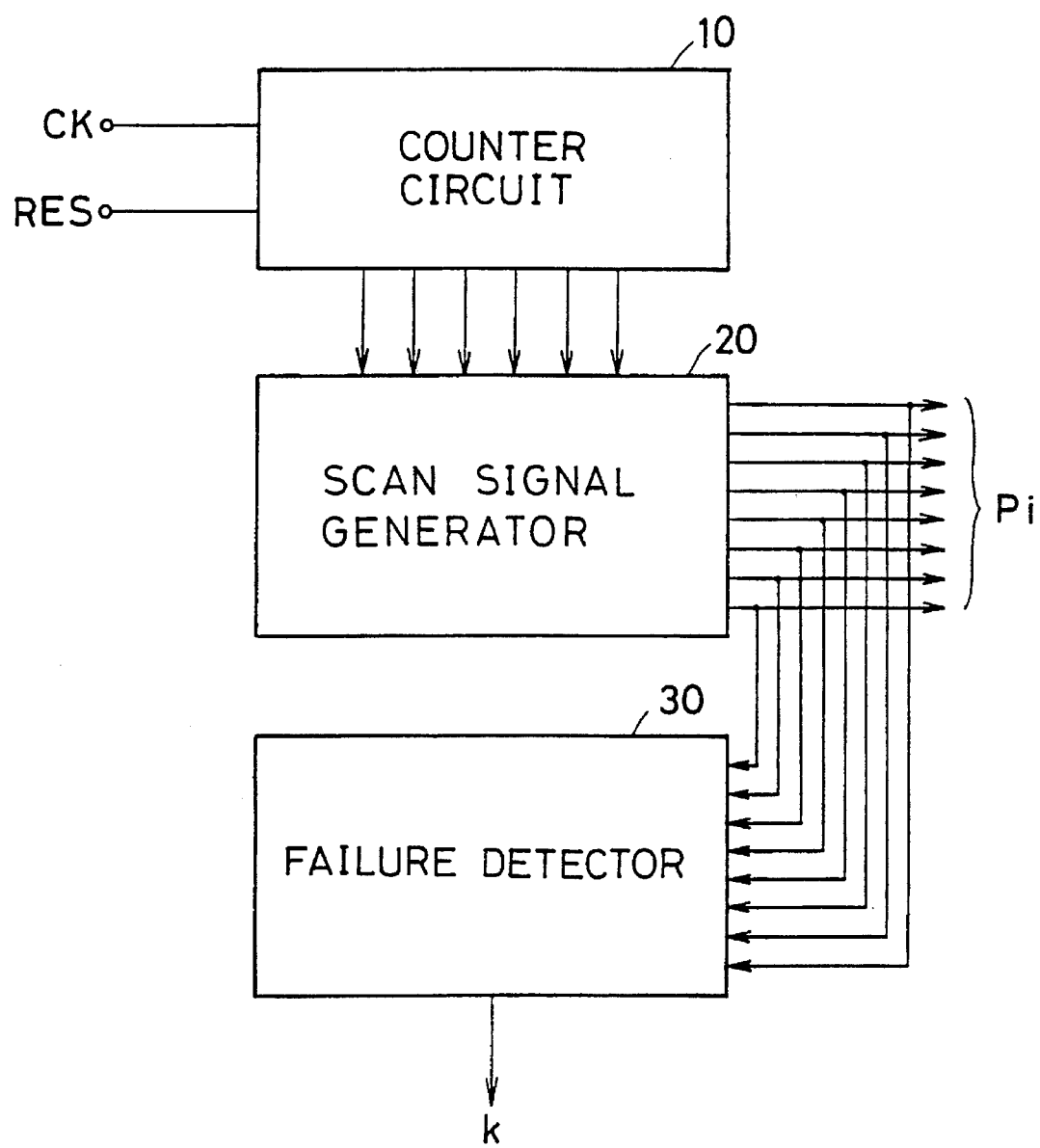
FIG. 1 is a general view showing a fail-safe scan circuit according to an embodiment of the present invention.

FIG. 1 shows the fail-safe scan circuit for sequentially and periodically driving objective devices, The fail-safe scan circuit has a counter circuit 10, a scan signal generator 20, and a fail-safe failure detector 30.

The counter circuit 10 receives a clock signal CK and periodically counts pulses thereof of the same number (eighth in this embodiment) as scan signals to be generated in a scan period of the objective devices.

The scan signal generator 20 converts count signals provided by the counter circuit 10 into consecutive high-frequency signals as scan signals Pi (i=1 to 8) for driving the objective devices.

The fail-safe failure detector 30 provides a signal k of logical value 1 representing a high energy state when the scan signals Pi provided by the generator 20 are all normal.

When either the abnormality condition wherein some of the scan signals Pi overlap or the abnormality condition wherein at least one of the scan signals Pi is not provided in a scan period is detected, or when both of these abnormality conditions are detected simultaneously, the failure detector 30 provides an output k of logic value 0 representing a low energy state.

Figure 2:
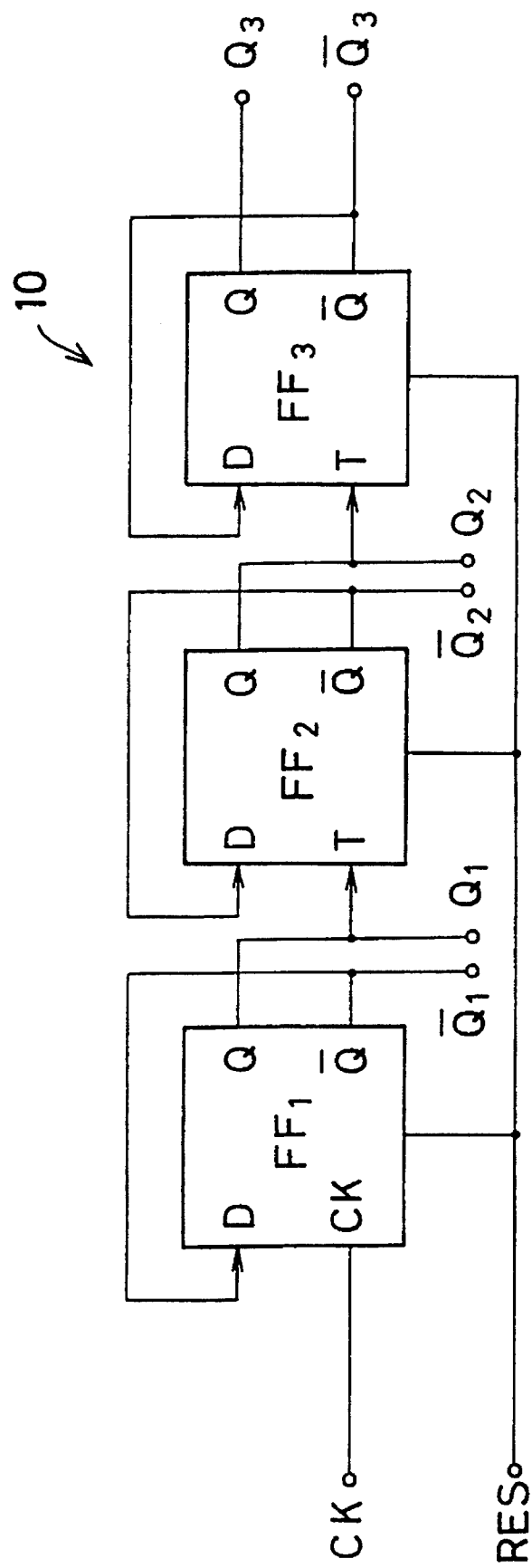
FIG. 2 shows a counter circuit of the embodiment.

FIG. 2 shows the details of the counter circuit 10.

The counter circuit 10 is a binary counter formed of three flip-flops FF1, FF2, and FF3. The counter circuit 10 periodically counts pulses of the clock signal CK with each period involving eight pulses of the clock signal CK. Counts in binary values are provided through positive terminals Q1, Q2, and Q3 and inverting terminal $\overline{Q1}$, $\overline{Q2}$, and $\overline{Q3}$ of the fail-flops FF1, FF2, and FF3.

Figure 3:
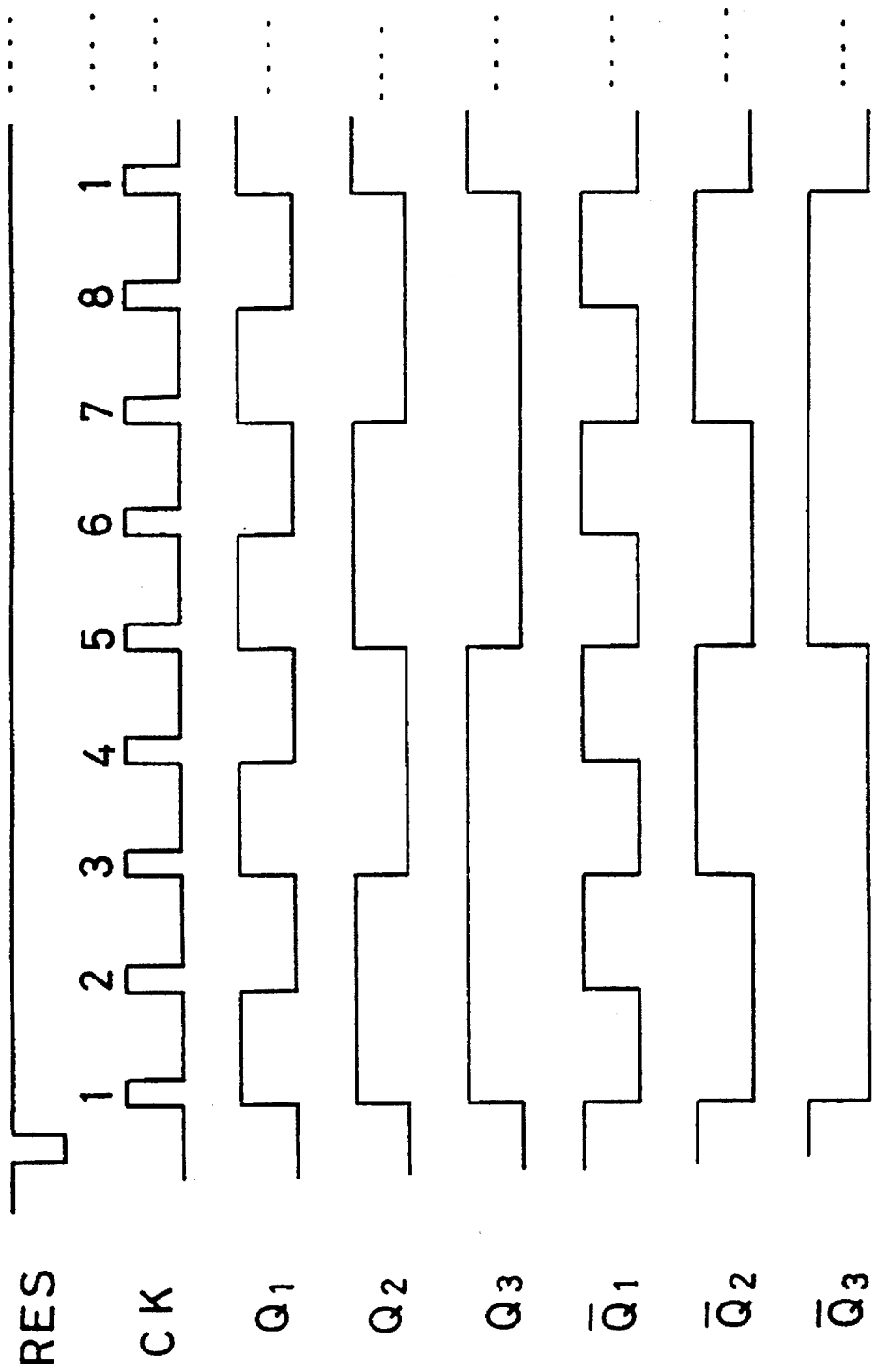
FIG. 3 is a time chart showing output signals of the counter circuit.

FIG. 3 is a time chart showing the operation timing of the flip-flops FF1 to FF3.

Figure 4:
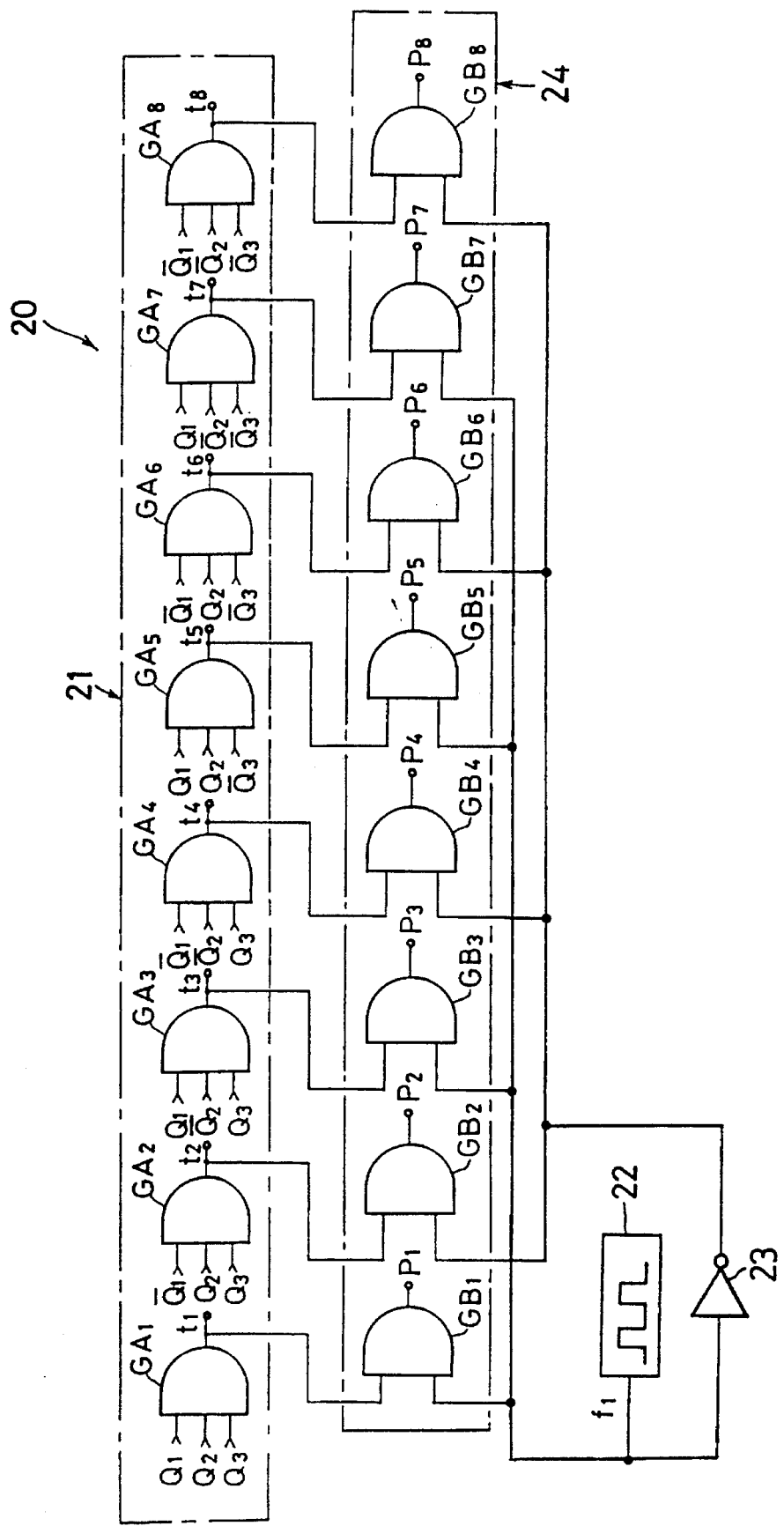
FIG. 4 shows a scan signal generator of the embodiment.

FIG. 4 shows the details of the scan signal generator 20.

The generator 20 has a first AND gate group 21, a high-frequency signal generator 22 for always generating a high-frequency signal of frequency f1, an inverter 23 for inverting (phase-shifting by π) the output of the generator 22, and a second AND gate group 24.

The first AND gate group 21 includes 3 input AND gates GAi (i =1 to 8) for providing consecutive rectangular signals ti (i=1 to 8) according to the count signals provided by the counter circuit 10.

The second AND gate group 24 includes as many 2-input AND gates GBi (i=1 to 8) as the objective devices. A first input terminal of each of the AND gates GBi receives one of the rectangular signals ti from a corresponding one of the first AND gates GAi. A second input terminal of each of the AND gates GBi (i =1, 3, 5, and 7) that receives every other rectangular signal ti (i= 1, 3, 5, and 7) receives the high-frequency signal from the generator 22. A second input terminal of each of the remaining AND gates GBi (i=2, 4, 6, and 8) receives the inverted high-frequency signal from the inverter 23. These AND gates GBi modulate the rectangular signals ti with the non-inverted and inverted high-frequency signals into the high-frequency scan signals Pi of frequency f1.

The operation of the scan signal generator 20 will be explained.

The counter circuit 10 provides the six outputs. Combinations of three of the outputs from eight signals, which are supplied to the AND gates GAi.

Figure 5:
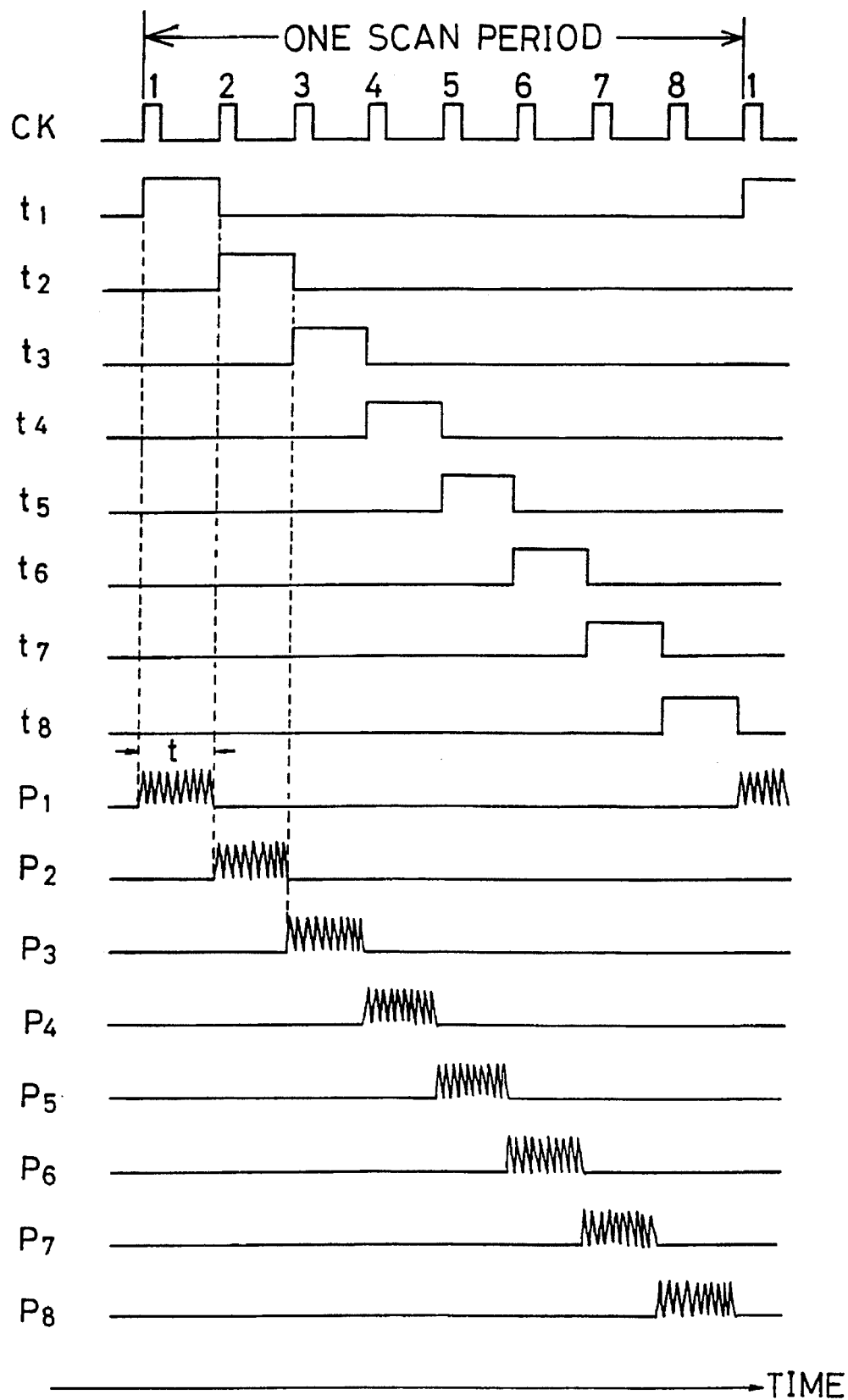
FIG. 5 is a time chart showing rectangular signals and scan signals generated by the scan signal generator.

When a first pulse of the clock signal CK is supplied to the counter circuit 10, the AND gate GA1 provides an output of logical value 1. In response to a second pulse of the clock signal CK, the AND gate GA1 provides an output of logical value 0, and at the same time, the AND gate GA2 provides an output of logical value 1. Similarly, the AND gates GA3 to GA8 sequentially provide outputs each of logical value 1 in response to corresponding pulses of the clock signal CK. Namely, the AND gates GA1 to GA8 of the first group 21 generate the consecutive rectangular signals t1 to t8 as shown in FIG. 5

Thereafter, the first AND gate group 21 is reset and initialized in response to a ninth pulse of the clock signal CK, and at the same time, the AND gate GA1 again provides an output of logical value 1. In this way, the rectangular signals ti are sequentially and periodically generated with each period involving eight pulses of the clock signal CK.

When any of the rectangular signals ti rises to a logical value 1, a corresponding one of the AND gates GBi modulates the signal ti into a high-frequency signal of frequency f1 according to the high-frequency signal provided by the generator 22 or the inverted high-frequency signal provided by the inverter 23. Namely, the second AND gate group 24 sequentially and periodically generates the consecutive high-frequency scan signals Pi as shown in FIG. 5.

Adjacent two of the scan signals Pi have a phase difference of π. Namely, the phase of each of the signals Pi (i=1, 3, 5, and 7) is the same as that of the high-frequency signal from the generator 22, and the phase of each of the signals Pi (i=2, 4, 6, and 8) is opposite (shifted by π) to that of a corresponding one of the signals Pi (i=1, 3, 5, and 7).

Figure 6:
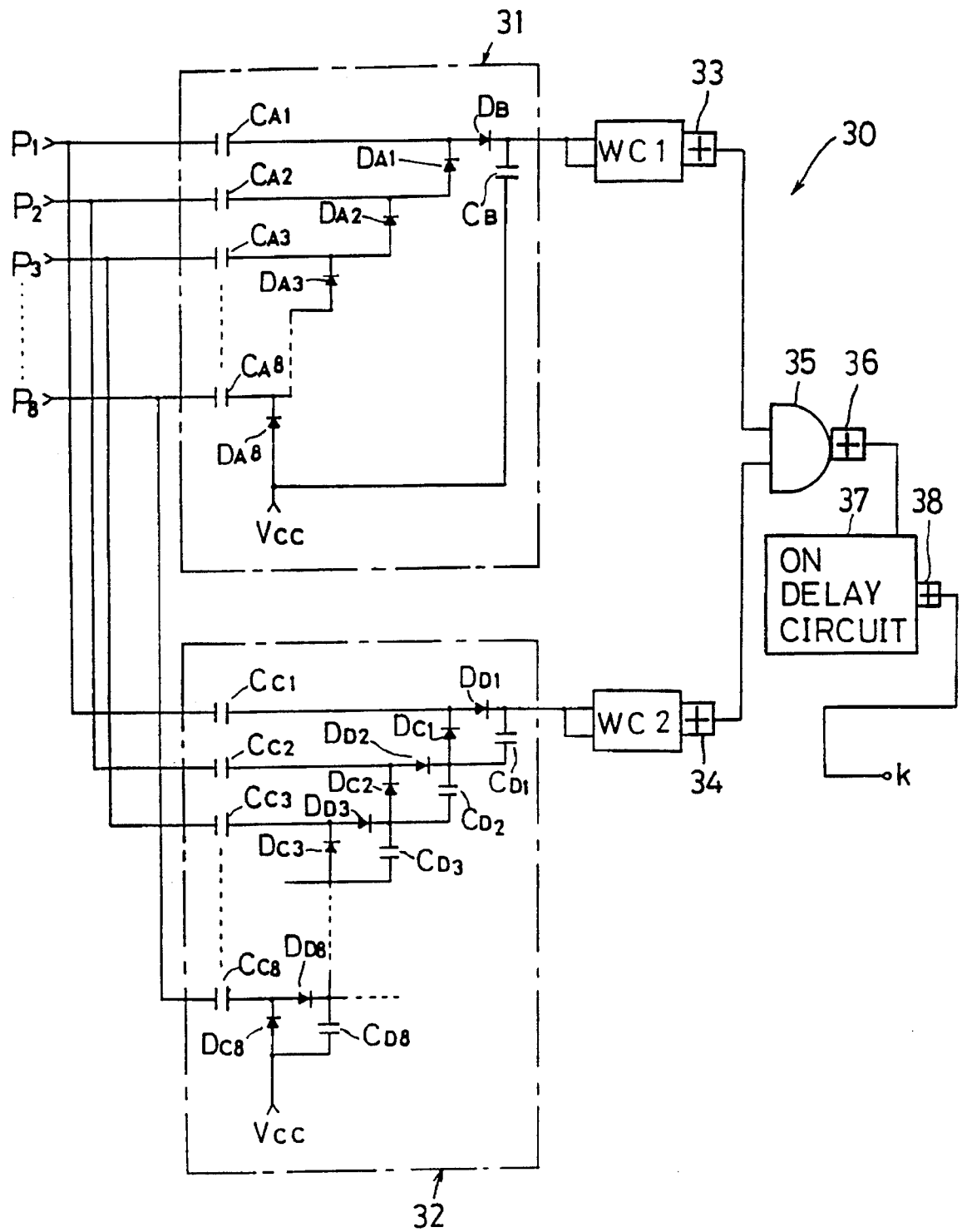
FIG. 6 shows a first example of a failure detector according to the present invention.

FIG. 6 shows a first example of the failure detector 30 according to the present invention.

The failure detector 30 has a first adder 31, which has voltage doubling and rectifying characteristics according to the present invention. The first adder 31 includes capacitors CAi (i=1 to 8), a capacitor CB, diodes DAi (i=1 to 8), and a diode DB.

The failure detector 30 also has a second adder 32 serving as a voltage doubler rectifier. The second adder 32 includes capacitors CCi and CDi (i=1 to 8) and diodes DCi and DDi (i=1 to 8).

Figure 7:
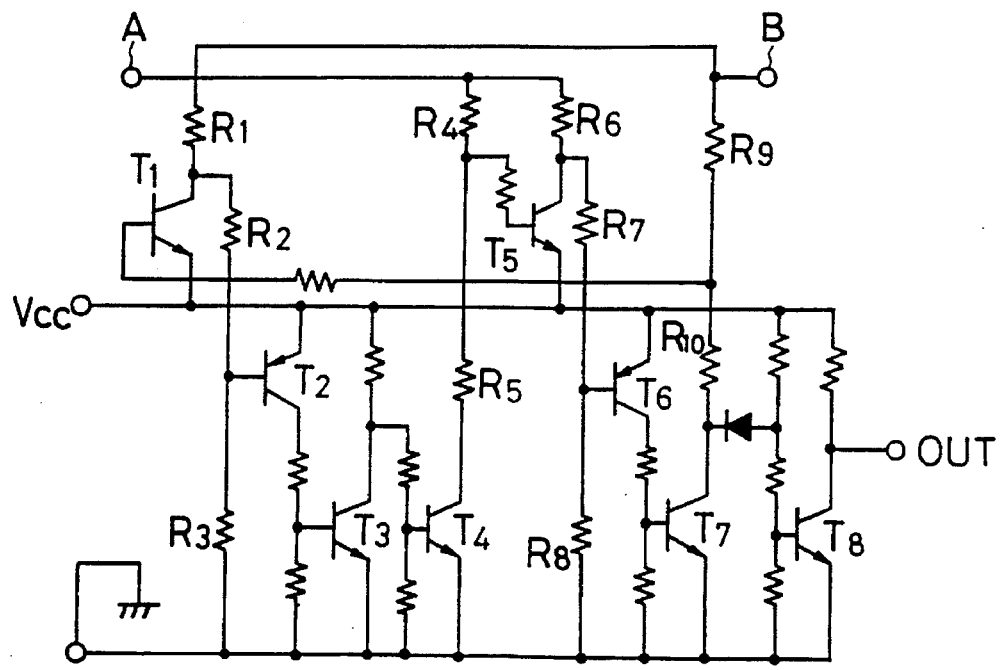
FIG. 7 shows a fail-safe window comparator.

The failure detector 30 further includes first and second fail-safe window comparators WC1 and WC2, which are each of known type such as one shown in FIG. 7 disclosed in U.S. Pat. No. 4,661,880. Outputs of the window comparators WC1 and WC2 are rectified by first and second rectifiers 33 and 34, respectively, Rectified outputs of the rectifiers 33 and 34 are supplied to a fail-safe AND gate 35 of known type such as one disclosed in U.S. Pat. No. 4,757,417. An output of the AND gate 35 is rectified by a rectifier 36. A rectified output of the rectifier 36 is supplied to a fail-safe ON delay circuit 37, which provides an output signal k depending on whether or not there is a failure according to the rectified output. The output signal k is rectified by a rectifier 38.

The output of the On delay circuit 37 rises a predetermined delay time after the reception of a signal from the rectifier 36. The On delay circuit 37 has fail-safe characteristics so that, if there is a failure, it extends the delay time, or provides no output.

When any scan signal Pi is provided to a corresponding input terminal of the first adder 31, the signal Pi is clamped to a source voltage Vcc by the diode DAi through the capacitor CAi that is connected to the input terminal in series. The capacitor CAi transfers the signal Pi to the output terminal of the first adder 31. This output terminal is connected to an input terminal of the window comparator WC1. Meanwhile, the capacitor CAi smooths a scan signal Pi+1 that follows the scan signal Pi.

The operation of the fail-safe window comparator will be briefly explained with reference to FIG. 7.

The fail-safe window comparator has many resistors and transistors and employs a source voltage Vcc.

When two input terminals A and B receive no signal, the transistor T1 is OFF, transistor T2 is On, transistor T3 is ON, transistor T4 is OFF, transistor T5 is OFF, transistor T6 is ON, and transistor T7 is ON.

The input terminals A and B receive an input signal Vin. When the input signal Vi is in the following range for the input terminal B:

(R1+R2+R3) Vcc/R3<Vin<(R4+R5) Vcc/R5 and is in the following range for the input terminal A:

(R6+R7+R8) Vcc/R8<Vin<(R9+R10) Vcc/R10 the transistor T2 turns OFF, T3 OFF, T4 ON, T5 OFF, T6 OFF, T7

OFF, T1 ON, T2 ON, T3 ON, T4 OFF, T5 ON, T6 ON, T7 ON, T1 OFF, T2 OFF, and so on. IN this way, the transistors repeatedly turn ON and OFF, to turn ON and OFF the transistor T8. As a result, an output terminal OUT of the window comparator provides an oscillation output corresponding to a logical value 1. The frequency of this oscillation output is, for example, about 100 KHz, which is sufficiently small compared with the width of each of the scan signals Pi (i=1 to 8) (FIG. 5).

Namely, the fail-safe window comparator provides an oscillation output only when the level of an input signal to the input terminals A and B is in the predetermined ranges.

The operation of the first adder 31 will be explained.

When any one of the scan signals Pi is discretely provided, the level of the signal is added to the source voltage Vcc and provided to the window comparator WC1.

When a plurality of the scan signals Pi, for example, P1 and P2 are simultaneously provided, the signal P1 will be at high level if the signal P2 is at low level because the signals P1 and P2 have opposite phases. Then, the capacitor CA2 is charged with the source voltage Vcc, and the level of the signal P1 is added to the source voltage Vcc through the capacitor CA1. The added level is supplied to the output terminal of the adder 31.

When the signal P2 rises to high level and the signal P1 falls to low level, the level of the signal P2 is added to the charged voltage Vcc of the capacitor CA2, and the capacitor CA1 is charged with the added level.

When the signal P2 again falls to low level and the signal P1 again rises to high level, the capacitor CA2 is charged with the source voltage Vcc, and the level of the signal P1 is added to the charged voltage of the capacitor CA1. As a result, the output terminal of the adder 31 provides the charged voltage of the capacitor CA1 plus the level of the signal P1. Namely, the output terminal provides the source voltage Vcc plus the levels of the signals P1 and P2.

In this way, a voltage at the output terminal of the adder 31 becomes higher when a plurality of the scan signals Pi are simultaneously provided to the input terminals of the adder 31 than when any one of the signals Pi is discretely provided to the input terminal.

When signals Pi and Pi+2 having the same phase are simultaneously provided, the capacitor CA (i+1) serves as a smoothing capacitor, and therefore, the output terminal of the adder 31 provides a higher level than a normal level.

A charge/discharge time constant of the first adder 31 determined by the capacitors CAi (i=1 to 8) and CB is set according to the frequency f1 of the scan signals Pi (i=1 to 8). Namely, the electrostatic capacitance of the capacitors CAi and CB is set to sample and hold a periodic signal whose frequency is 1/f1, which is equal to the frequency of one of the scan signals Pi.

Accordingly, when any one of the scan signals Pi is supplied to the first adder 31, the capacitor CB accumulates the input and raises its output at once. When the scan signal disappears, the output of the capacitor CB disappears at once. Accordingly, when the scan signals Pi are normally and sequentially generated one after another, an input level to the window comparator WC1 will be the sum of the level of one of the scan signals Pi and the source voltage Vcc.

In the second adder 32, each of the scan signals Pi is provided to a corresponding one of the series connected capacitors CCi, clamped to the source voltage Vcc by a corresponding one of the diodes DCi, and accumulated in a corresponding one of the capacitors CDi.

When one of the scan signals Pi is discretely provided to the second adder 32, the level of the scan signal is added to the source voltage Vcc and supplied to the window comparator WC2.

When some of the scan signals Pi, for example, signals Pi and Pj (j=i+1) are simultaneously provided to the second adder 32, the level of the signal Pi is added to the source voltage Vcc, and the added result is accumulated in the capacitor CDi. At the same time, the level of the signal Pj is added to the level of the signal Pi accumulated in the capacitor CDi, and the added result is accumulated in the capacitor CDj (j=i+1). The added result is then supplied to the window comparator WC2.

A time constant of the second adder 32 determined by the capacitors CCi and CDi is set for a period of the scan signals Pi. Namely, the electrostatic capacitance of the capacitors CCi and CDi is set to sample and hold the sum of input levels of the scan signals P1 to P8. Accordingly, the capacitors CDi continuously accumulate the input levels of the signals Pi for a period. Namely, at the end of each period of the signals Pi, and input level to the window comparator WC2 is the sum of the input levels of all scan signals Pi generated within the period and the source voltage Vcc.

Each of the scan signals Pi has a logical level ei. Accordingly, in a normal state, the window comparator WC1 receives a logical level of Vcc+ei, and the window comparator WC2 receives a logical level of Vcc+8×ei.

The input terminals A and B (FIG. 7) of each of the fail-safe window comparators WC1 and WC2 are commonly connected to each other. Accordingly, each window comparator generates an alternating output signal only when an input level to the common input terminal is within a predetermined range.

The resistance values of the resistors R1 to R10 of the window comparator WC1 are set such that the predetermined range for providing an alternating output signal from the window comparator WC1 will be as follows:

$$Vcc+ei\pm\Delta e \ (ei>\Delta e)$$

The resistance values of the resistors R1 to R10 of the window comparator WC2 are set such that the predetermined range for providing an alternating output signal from the window comparator WC2 will be as follows:

$$Vcc+8ei\pm\Delta e$$

Accordingly, the output level of the first adder 31 will be in the predetermined range only when the scan signals Pi are sequentially generated one after another. In this case, the window comparator WC1 successively provides outputs each of logical value 1. When some of the scan signals Pi overlap, the output level of the first adder 31 will exceed "Vcc+2ei" to come out of the predetermined range. Then, the window comparator WC1 provides an output of logical value 0.

The first adder 31, window comparator WC1, and first rectifier 33 from a first detective function unit that determines whether or not some of the scan signals Pi are overlapping.

The output level of the second adder 32 will be within the predetermined range only when all scan signals Pi are completely generated in a scan period. In this case, the window comparator WC2 provides an output of logical value 1. If at least one of the scan signals Pi is not generated in a scan period, the output level of the second adder 32 will be less than "Vcc+7ei" so that the window comparator WC2 provides an output of logical value 0.

The second adder 32, window comparator WC2, and second rectifier 34 form a second detective function unit that determines whether or not all scan signals Pi have been generated within a period.

The fail-safe AND gate 35 generates an alternating output signal only when its two input terminals receive input signals of predetermined levels (in this embodiment, each level is higher than the source voltage Vcc). The AND gate 35 may be formed of the circuit of FIG. 7. The AND gate 35 provides an output of logical value 1 when the window comparators WC1 and WC2 provide each a signal of logical value 1. Moreover, an output of the AND gate 35 becomes the logic value 0 when either the window comparator WC1 or the window comparator WC2 provides an output of logic value 0 (that is, when either the abnormality condition wherein some of the scan signals overlap or the abnormality condition wherein at least one of the scan signals is not provided in a scan period is detected) and when both of the window comparators WC1 and WC2 provide outputs of logic value 0 (that is, both of these abnormality conditions are detected simultaneously). The output of the AND gate 35 is rectified by the rectifier 36, and the rectified output is sent to the ON delay circuit.37.

The On delay circuit 37 involves a delay time that is longer than at least a period of the scan signals Pi.

The operation of the fail-safe scan circuit will be explained.

An operation when the scan circuit is normal will be explained.

A reset signal RES initializes the counter circuit 10. In response to pulses of the clock signal CK, the AND gates GA1 to GA8 in the group 21 of the scan signal generator 20 sequentially generate rectangular signals t1 to t8, respectively. These signals t1 to t8 are temporally consecutive as shown in FIG. 5. In synchronism with these signals, the AND gates GB1 to GB8 in the group 24 generate high-frequency scan signals P1 to P8, respectively. The scan signals P1 to P8 have a frequency of f1. Adjacent two of the scan signals have a phase difference of $\pi$ as shown in FIG. 5.

These operations are repeated at periods of eight pulses of the clock signal CK.

The scan signals Pi (i=1 to 8) are provided to the first and second adders 31 and 32 of the failure detector 30. If the scan signals Pi are normal and consecutive, the output level of the first adder 31 will be in the range of Vcc+ei±Δe whenever one of the scan signals P1 is entered thereto. Then, the first window comparator WC1 provides an output of logical value 1, which is rectified by the rectifier 33 and provided to the AND gate 35.

Meanwhile, the output level of the second adder 32 will be in the range of Vcc+8ei±Δe if the scan signals Pi are correctly entered thereto within a period. Then, the second window comparator WC2 provides an output of logical value 1, which is rectified by the rectifier 34 and provided to the AND gate 35.

When the window comparators WC1 and WC2 provide each an output signal of logical value 1, the AND gate 35 provides an output signal of logical value 1, which is rectified by the rectifier 36 and provided to the On delay circuit 37.

Receiving the rectified output from the rectifier 36, the On delay circuit 37 provides no output until scan signals Pi (i=1 to 8) of the next period have been generated. Once the scan signals Pi of the next period have been generated, the On delay circuit 37 provides an output K based on the rectified output signal of the AND gate 35 of the proceeding period.

The rectifier 38 rectifies the output k. The output k will have a logical value 1 indicating a high energy state only when the scan circuit is normal.

An operation when the scan circuit is out of order will be explained.

The counter circuit 10 and the first and second AND gate groups 21 and 22 of the scan signal generator 20 have several failure modes. For example, any of the output signals of the flip-flops FF1 to FF3 of the counter circuit 10 and the AND gates GAi and GBi of the scan signal generator 20 are fixed to a logical value 1 or 0, or the AND gates GAi and GBi provide each a gate input signal as it is as a scan signal Pi.

If at least one of the AND gates GAi and GBi fail, scan signals Pi and Pj (i is not equal to j) will be simultaneously generated or partly overlap, or one of the scan signals Pi will not be generated.

There are other failure modes that an output signal of the counter circuit 10 is fixed to 1 and that one of the rectangular signals ti to the AND gates GBi is fixed to 1. On these failures, the high-frequency signal from the high-frequency signal generator 22 or the inverted high-frequency signal from the inverter 23 will be successively provided as the scan signals Pi.

The operation of the failure detector 30 against these failure modes will be explained.

If the counter circuit 10 or at least one of the AND gates GAi fails and always provides a signal of logical value 1, the high-frequency signal of frequency f1 from the generator 22 will be always provided as one of the scan signals Pi. If the remaining ones of the scan signals Pi are consecutively provided, the output level of the first adder 31 to the window comparator WC1 will exceed Vcc+2ei, so that the window comparator WC1 stops to provide its output (i.e., providing a logical value 0).

If at least one of the AND gates GBi is fixed to a logical value 0, at least one of the scan signals Pi will not be provided. In this case, the output of the second comparator 32 to the window comparator WC2 becomes lower than Vcc+7ei, so that the window comparator WC2 stops its output (i.e., providing a logical value 0).

If the AND gates GAi and GBi fail and if some of the scan signals Pi are simultaneously generated, the window comparator WC1 will receive an input level of greater than Vcc+2ei for a moment of the simultaneous generation, so that the window comparator WC1 stops its output for the moment.

If the AND gates GAi and GBi fail and if some of the scan signals Pi partly overlap, the window comparator WC1 will receive an input level of greater than Vcc+2ei for a moment of the overlapping, so that the window comparator WC1 stops its output for the moment.

In this way, if the counter circuit 10 or the scan signal generator 20 fails, the AND gate 35 stops to provide its output at least for a moment of the failure within a scan period. This momentary stoppage occurs in every scan period. Since the delay time of the ON delay circuit 37 is longer than one scan period, the ON delay circuit 37 continuously stops to provide an output signal once the AND gate 35 stops its output. Namely, the ON delay circuit 37 provides an output signal k of logical value 0 indicating a low energy state to inform of the failure.

In this way, the failure detector 30 provides the output signal k of logical value 0 if at least one of the scan signals Pi (i= 1 to 8) is not generated, or if at least two of the scan signals Pi are simultaneously generated, or if at least two of the scan signals Pi partly overlap.

It should be noted that the failure detector 30 provides the output signal k of logic value 0 when a failure wherein at least one of the scan signals Pi is missed (i.e., the window comparator WC2 ceases to provide an output signal) and a failure wherein at least two of the scan signals Pi are simultaneously generated or at least two of the scan signals Pi partly overlap (i.e., the window comparator WC1 ceases to provide an output signal) occur simultaneously.

Figure 8:
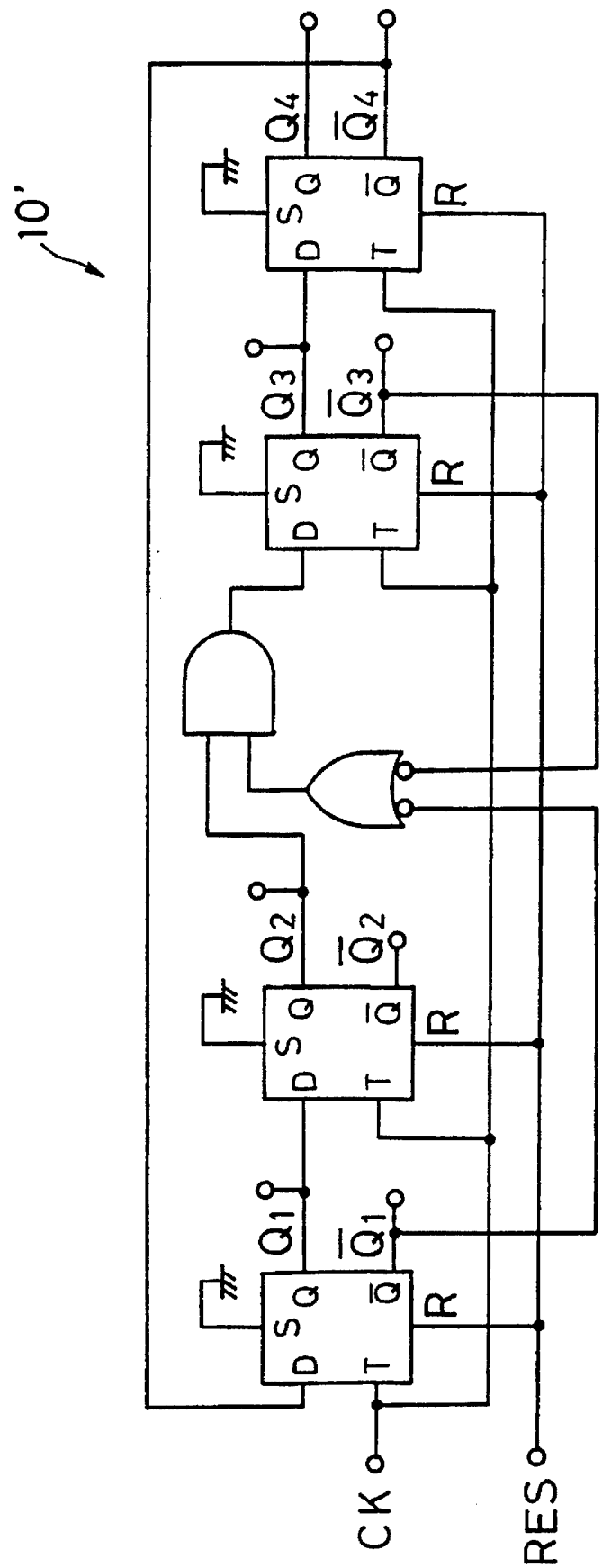
FIG. 8 shows another example of the counter circuit according to the present invention.
Figure 9:
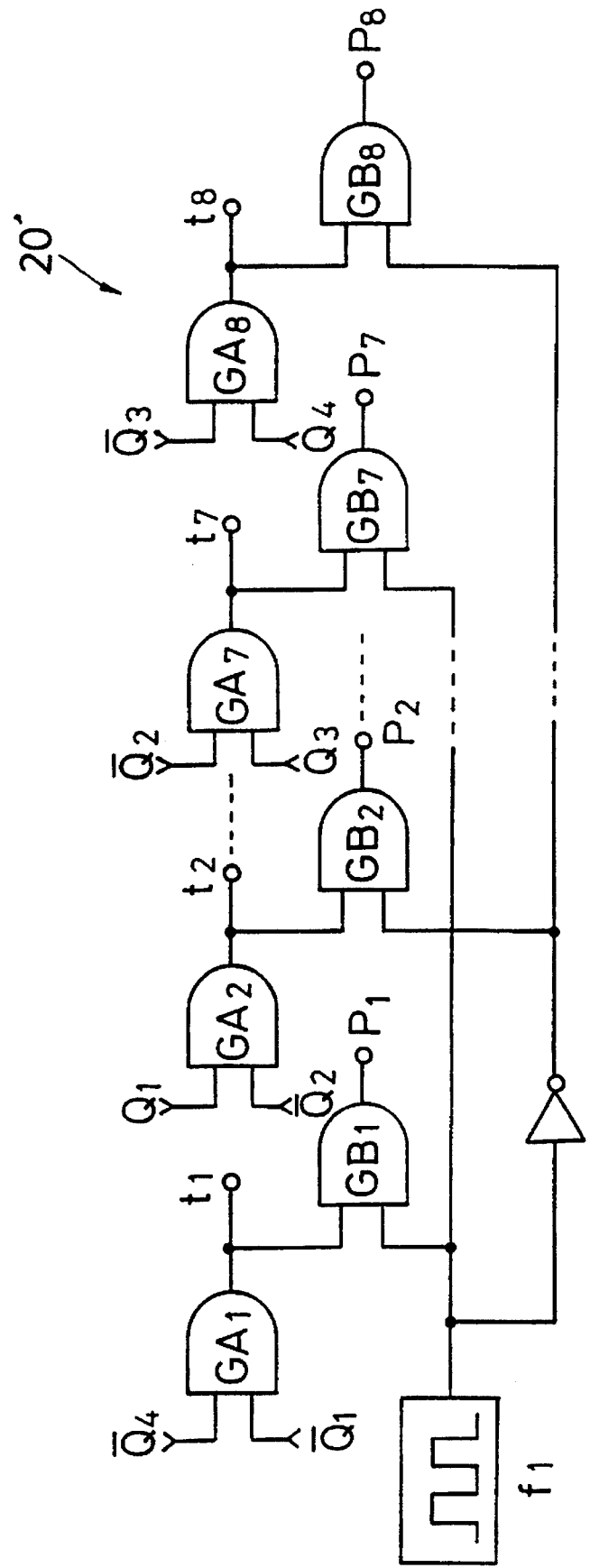
FIG. 9 shows a scan signal generator employing the counter circuit of FIG. 7.

In FIG. 2, the binary counter is formed of the flip-flops FF1 to FF3, and in FIG. 4, the 3-input AND gates GAi (i=1 to 8) are employed to sequentially and periodically generate rectangular signals ti (i=1 to 8). Instead, a shift register 10' of FIG. 8 may be combined with a scan signal generator 20' of FIG. 9 employing 2-input AND gates, to sequentially and periodically generate rectangular signals ti (i=1 to 8). According to these rectangular signals ti, scan signals Pi (i=1 to 8) will be generated, similar to FIG. 4. With these signals Pi, the failure detector 30 operates in the same manner as explained before.

A failure in the voltage doubler rectifier formed of the capacitor CA8 and diode DA8 of the first adder 31 will be explained.

If the capacitor CA8 is short-circuited, the source voltage Vcc is short-circuited to the input end for receiving the scan signal P8 through the diode DA8, so that the capacitor CV provides no output. If the diode DA8 is broken too, the capacitor CB provides no output. If the capacitor CA8 is sound and if the diode DA8 is broken, no output is provided because the discharge path of the capacitor CA8 is cut. If the capacitor CA8 is broken, or if the diode DA8 is short-circuited, no alternating signal is transferred to the output side of the adder 31, so that the adder 31 provides no output. In this way, if the capacitor CA8 or diode DA8 is broken or short-circuited, the adder 31 provides no DC output.

The first and second adders 31 and 32 each formed of such voltage doubler rectifier, therefore, never provide an erroneous output if none of the scan signals Pi (input signals) are provided thereto.

Similarly, the rectifiers 33, 34, and 36 provided on the output sides of the window comparators WC1 and WC2 and AND gate 35 never provide such an erroneous output.

Also, the window comparators WC1 and WC2, AND gate 35, and ON delay circuit 37 never provide an erroneous output even if they themselves fail.

In this way, the failure detector 30 of FIG. 6 is a fail-safe circuit that never erroneously provides an output k of logical value 1 if none of the scan signals Pi are provided thereto.

This fail-safe failure detector 30 monitors the operating conditions of the counter circuit 10 and scan signal generator 20. If the counter circuit 10 or the scan signal generator 20 fails, or if the failure detector 30 itself fails, the failure detector 30 stops to provide an output k of logical value 1, i.e., provides an output k of logical value 0, thereby informing of the failure. In this way, the scan circuit according to this embodiment is fail-safe.

Since adjacent two of the scan signals Pi have a phase difference of π, the first adder 31 of the failure detector 30 is simple. For example, the numbers of the capacitors and diodes of the first adder 31 are about half the numbers of those of the first adder of the fail-safe scan circuit disclosed in PCT/JP92/00631.

A second example of a failure detector according to the present invention will be explained with reference to FIGS. 10 to 16.

Figure 10:
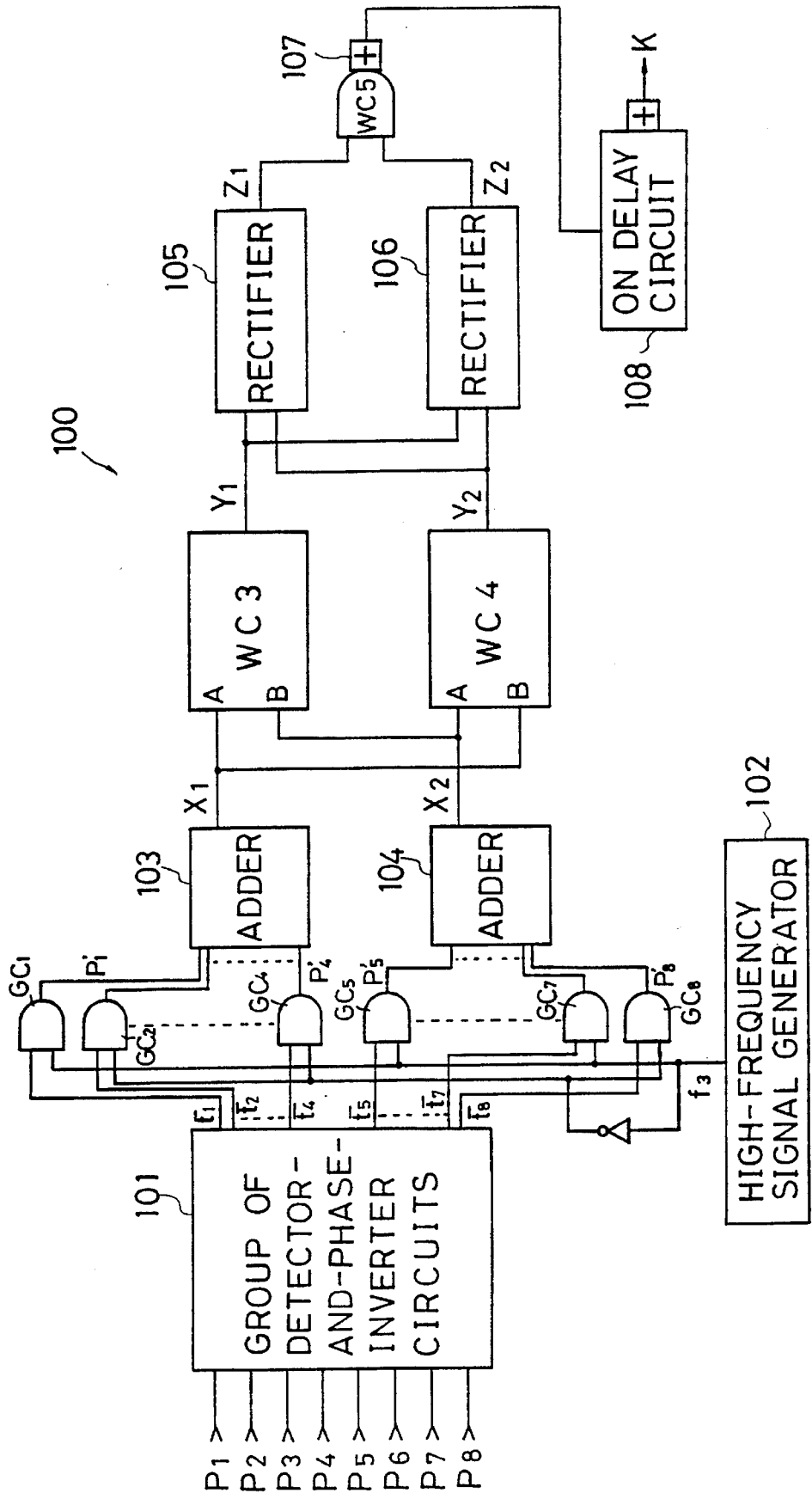
FIG. 10 shows a second example of a failure detector according to the present invention.

The failure detector 100 of FIG. 10 receives scan signals Pi (i =1 to 8). These signals Pi have the same phase and generated by a scan signal generator that is similar to the generator 20 or 20' of FIGS. 4 and 9 but with no inverter. Accordingly, the AND gates GBi (i=1 to 8) in the second group 24 directly receive a high-frequency signal from the high-frequency signal generator 22.

The scan signals Pi are received by a group 101 of detector-and phase-inverter circuits. The group 101 includes detector-and-phase-inverter circuits for the scan signals P1 to P8, respectively.

Figure 11A:
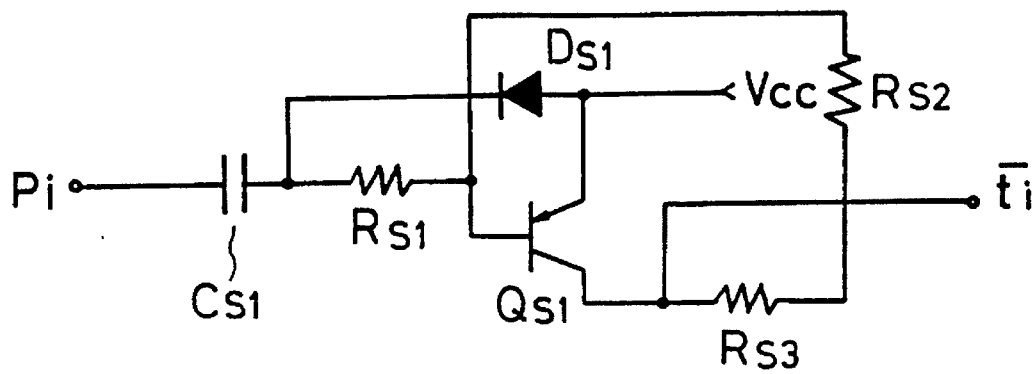
FIG. 11(A) shows a detector-and-phase-inverter circuit for the failure detector.

FIG. 11(A) shows one of the detector-and-phase-inverter circuits. This circuit includes a detector formed of a capacitor CS1, a variable capacitance diode DS1, and resistors RS1 and RS2. The circuit also includes a phase inverter formed of a resistor RS3 and a transistor QS1. The detector detects a corresponding one of the scan signals Pi, and the phase inverter inverts the phase of the detected signal and provides a rectangular signal ti whose phase is opposite to that of a rectangular signal ti. In response to the sequentially provided scan signals P1 to P8, the group 101 sequentially generates rectangular signals t1 to t8.

The capacitor CS1 adds the scan signal Pi to a source voltage Vcc and provides the added voltage to the variable capacitance diode DS1. The diode DS1 clamps the signal Pi to the source voltage Vcc. At the same time, the electrostatic capacitance at terminals of the diode DS1 detects the signal Pi. The voltage of the detected signal is divided by the resistors RS1 and RS2, and the divided voltage is provided to the base of the transistor QS1. The resistor RS3 serves as a collector resistor of the transistor QS1.

Since the voltage of the detected signal is divided by the resistors RS1 and RS2, the detected signal (whose potential is higher than the source potential Vcc) added to the source potential Vcc switches the transistor QS1 in a way to turn ON the transistor QS1 when the detected signal is at low level (the level of the source potential Vcc) and turn OFF the transistor QS1 when the detected signal is at high level (higher than the level of the source potential Vcc).

The detector-and-phase-inverter circuit of FIG. 11(A) generates no signal whose potential is higher than the source potential Vcc if the capacitor CS1 is short-circuited or broken, or if the variable capacitance diode DS1 is short-circuited or broken. Accordingly, the transistor QS1 is not switched due to such trouble.

Similarly, no switching signal for the transistor QS1 is produced if any one of the resistors RS1, RS2, and RS3 breaks, or if the transistor QS1 fails.

Figure 11B:
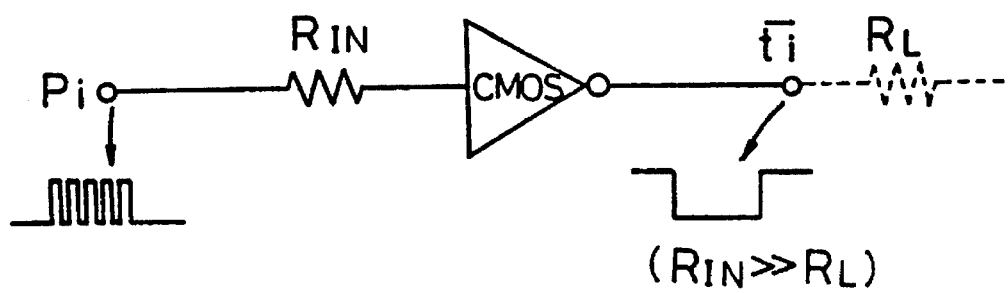
FIG. 11(B) shows another detector-and-phase-inverter circuit for the failure detector.

FIG. 11(B) shows another example of a detector-and-phase-inverter circuit. This circuit employs a CMOS circuit whose output is inverted. When a resistor RIN is arranged on the input side of the CMOS circuit, the CMOS circuit will not respond to high frequencies due to electrostatic capacitance between the gate and source of the CMOS circuit.

Figure 11C:
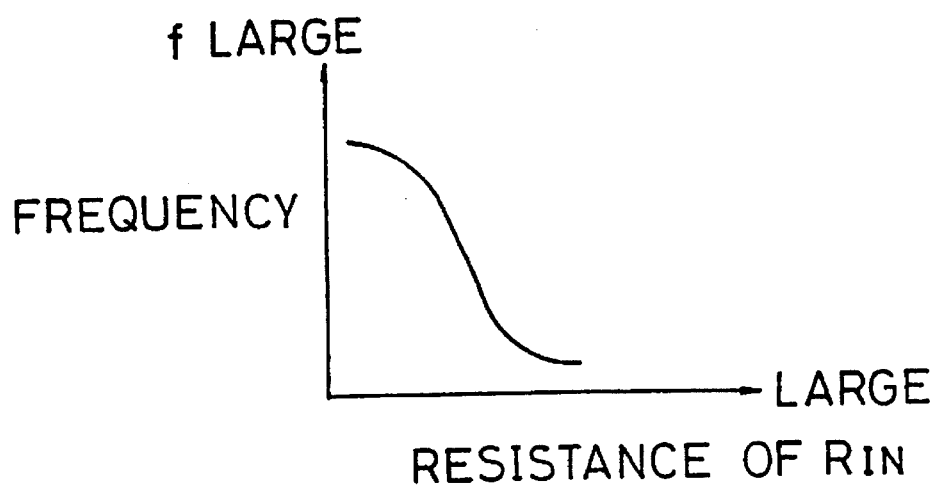
FIG. 11(C) shows a relationship between an input resistance value and a response frequency.

FIG. 11(C) shows frequencies f to which the CMOS circuit can respond and resistance values of the input resistor RIN. Due to the resistor RIN, the detector-and-phase-inverter circuit has wave detecting characteristics indicated with an input/output signal waveform shown in FIG. 11(B).

If the CMOS circuit fails, the circuit of FIG. 11(B) provides no switching output. If the input terminal of the CMOS circuit is directly connected to the output side, an input signal will not substantially appear on the output side if a load resistor RL connected to the output of the CMOS circuit is sufficiently smaller than the input resistor RIN (RIN>>RL).

The rectangular signals/t1 to/t8 from the detector-and-phase-inverter circuit group 101 are provided to one input ends of AND gates GC1 to GC8, respectively. The other input terminal of each of the AND gates GCi (i=1 to 8)

receives a high-frequency signal of frequency f3 from a high-frequency signal generator 102. Similar to the arrangements of FIGS. 4 and 9 each involving an inverter, the rectangular signals/t1 to/t8 are modulated into scan signals Pi' (i=1 to 8). The frequency f3 of the generator 102 is higher than the frequency f1 of the generator 22 (f3>f1).

Figure 12:
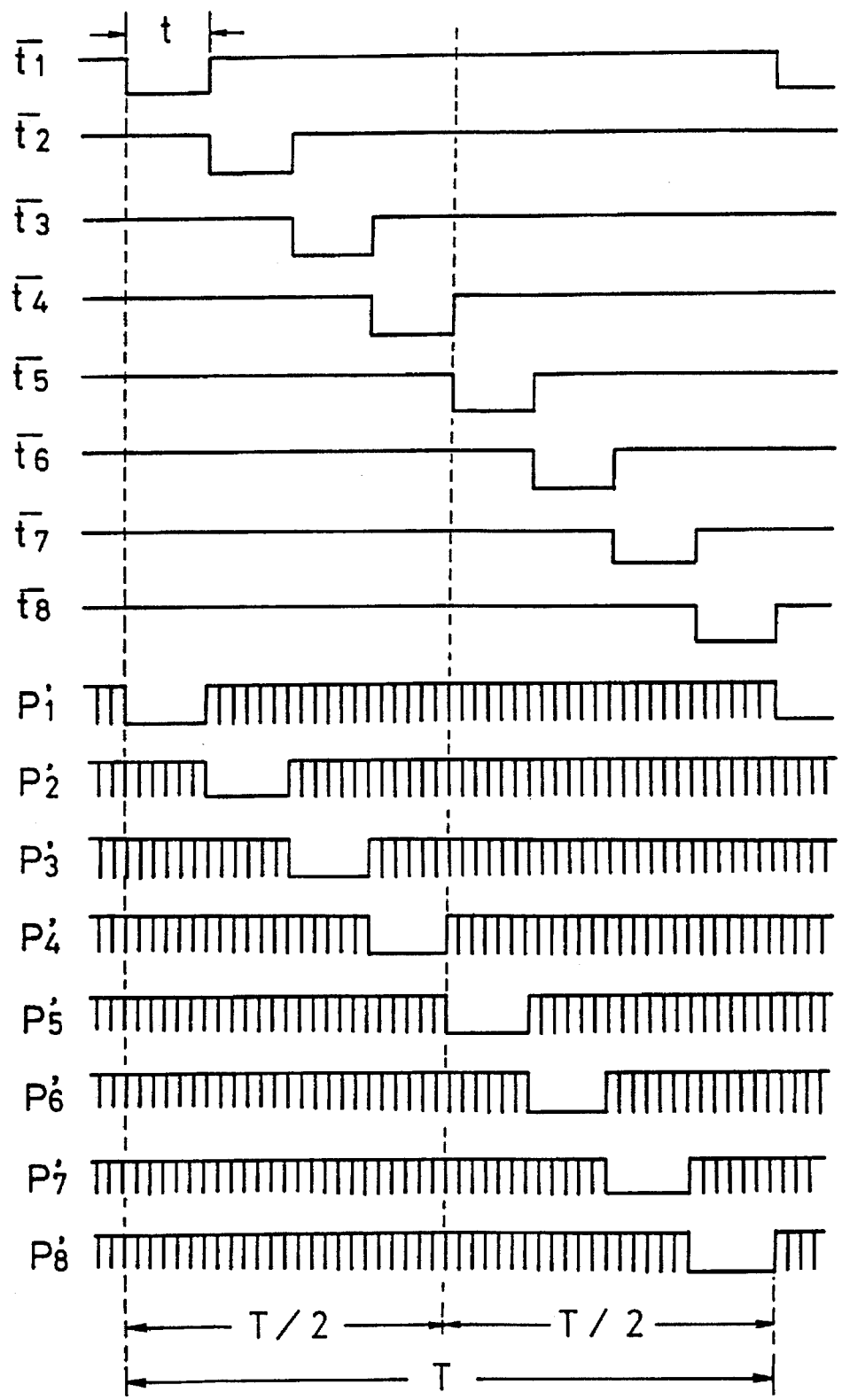
FIG. 12 is a time chart showing output signals of a group of detector-and-phase-inverter circuits and scan signals modulated from the output signals.

FIG. 12 shows waveforms provided by the detector-and-phase-inverter circuit group 101.

The scan signals Pi' provided by the AND gates GCi are divided into, for example, two groups each including four of the scan signals Pi'. Namely, the scan signals P1' to P4' are provided to a third adder 103, and the scan signals P5' to P8' are provided to a fourth adder 104.

The third and fourth adders 103 and 104 have each capacitors and diodes, similar to the second adder 32 of FIG. 6. The adders 103 and 104 operate each similar to the first adder 31 of FIG. 6 and provide each the sum of the four signals Pi.

Outputs of the adders 103 and 104 are supplied to first and second input terminals A and B of each of third and fourth fail-safe 2-input window comparators WC3 and WC4. Each of the window comparators WC3 and WC4 is the same as the window comparator of FIG. 7. The first input terminal A of the third window comparator WC3 receives the output of the third adder 103, and the second input terminal B thereof receives the output of the fourth adder 104. The first input terminal A of the fourth window comparator WC4 receives the output of the fourth adder 104, and the second input terminal B thereof receives the output of the third adder 103.

The outputs of the third and fourth adders 103 and 104 will be explained.

In FIG. 12, a scan period of the scan signals Pi' is T, which is the same as a scan period of the scan signals Pi. At each instant in a first half period T/2, one of the scan signals P1' to P4' in the third adder 103 is at low level. At this moment, all signals P5' to P8' in the fourth adder 104 are each at high level. At each instant in a second half period T/2, the scan signals P1' to P4' in the third adder 103 are each at high level. At this moment, one of the scan signals P5' to P8' in the fourth adder 104 is at low level.

Figure 13:
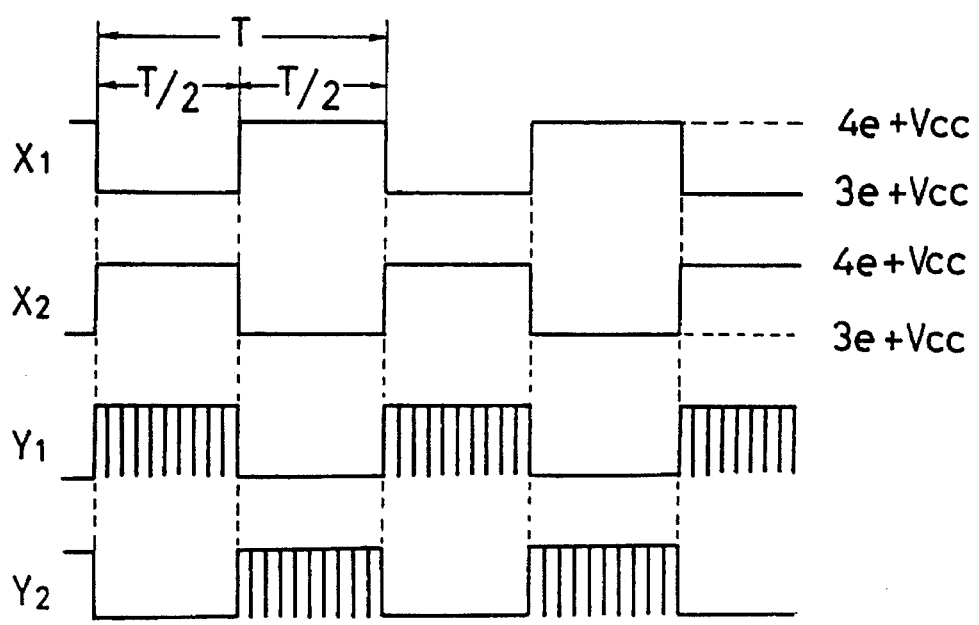
FIG. 13 is a time chart showing a relationship between outputs of an adder and a window comparator in the failure detector.

Supposing the output level (logical level) of each of the scan signals Pi' is e, the output level of the third adder 103 in the first half period is 3e, and the output level of the fourth adder 104 in the same period is 4e. In the second half period, the output level of the third adder 103 is 4e, and that of the fourth adder 104 is 3e. Accordingly, the outputs X1 and X2 of the third and fourth adders 103 and 104 will be as shown in FIG. 13 when the scan signals Pi' are sequentially provided to the adders.

Ranges of levels of an input signal Vin that make the third and fourth window comparators WC3 and WC4 oscillate will be explained.

A range of input levels at the first input terminal A of each of the third and fourth window comparators WC3 and WC4 is as follows:

Vcc+3e±Δe (Δe<e)

A range of input levels at the second input terminal B of each of the window comparators WC3 and WC4 is as follows:

Vcc+4e±Δe (Δe<e)

The third and fourth window comparators WC3 and WC4 provide output signals Y1 and Y2, respectively. The signal Y1 will be an oscillation signal of logical value 1 only when each of the scan signals P1' to P4' is at low level and each of the scan signals P5' to P8' is at high level. On the other hand, the signals Y2 will be an oscillation signal of logical value 1 only when each of the scan signals P1' to P4' is at high level and one of the scan signals P5' to P8' is at low level.

FIG. 13 shows these relationships among the output signals X1 and X2 of the adders 103 and 104 and the output signals Y1 and Y2 of the window comparators WC3 and WC4.

The oscillation signals Y1 and Y2 of the window comparators WC3 and WC4 are supplied to third and fourth rectifiers 105 and 106, respectively.

Figure 14:
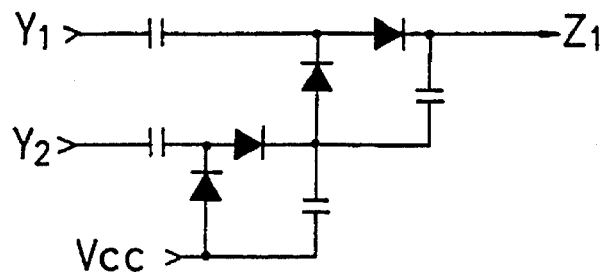
FIG. 14 shows a third rectifier in the failure detector.

FIG. 14 shows the third rectifier 105 having capacitors and diodes. The time constant of the rectifier 105 is determined according to the scan period T. When the window comparators WC3 and WC4 are alternately and normally providing the signals Y1 and Y2, the rectifier 105 provides an output Z1 that is the sum of the levels of the signals Y1 and Y2.

Figure 15:
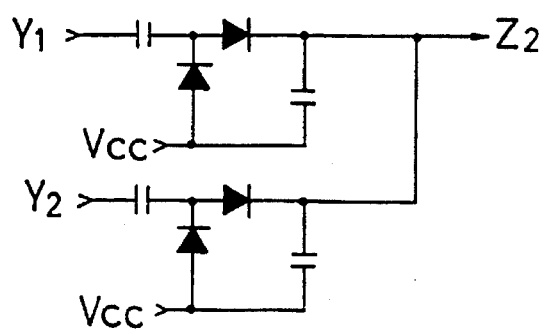
FIG. 15 shows a fourth rectifier in the failure detector.

FIG. 15 shows the fourth rectifier 106 having capacitors and diodes. The time constant of the rectifier 106 is smaller than that of the third rectifier 105 and is determined according to the oscillation frequency of the window comparators WC3 and WC4. The time constant of the rectifier 106 is determined such that an output signal Z2 of the rectifier 106 becomes zero in a pulse width of T/8 when the window comparators WC3 and WC4 provide no oscillation outputs Y1 and Y2. When one of the output signals Y1 and Y2 is provided from the window comparators WC3 and WC4, fourth rectifier 106 provides an output signal Z2 of logical value 1 as a wired-OR of the signals Y1 and Y2.

The output signals Z1 and Z2 of the rectifiers 105 and 106 are provided to a fifth fail-safe 2 input window comparator WC5. An input window of the window comparator WC5 is open to receive the output Z1 of the third rectifier 105. The window comparator WC5 provides an oscillation output signal only when the level of the output Z1 of the third rectifier 105 is the sum of the window comparators WC3 and WC4 (the sum corresponds to a logical value 2 when each of the window comparators WC3 and WC4 provides an output of logical value 1) and the output Z2 of the fourth rectifier 106 is a logical value 1.

Similar to the failure detector 30 of FIG. 6, an output of the fifth window comparator WC5 is rectified by a rectifier 107, which provides a rectified output to an ON delay circuit 108. The ON delay circuit 108 involves a delay time longer than the scan period T and provides an output K after the delay time.

The operation of the failure detector 100 of FIG. 10 will be explained.

An operation when the scan circuit is normal will be explained at first.

The scan signal generator sequentially and periodically provides eight scan signals Pi (i=1 to 8). The detector-and-phase-inverter circuit group 101 inverts the phases of the scan signals Pi, to generate rectangular signals $\overline{ti}$ (i=1 to 8) as shown in FIG. 12. The AND gates GCi (i=1 to 8) modulate the rectangular signals $\overline{ti}$ into scan signals Pi' (i=1 to 8) whose frequency is higher than that of the scan signals Pi. Four of the scan signals Pi' are provided to the third adder 103, and the remaining four are provided to the fourth adder 104.

When the scan signals Pi' are sequential and normal, one of the signals P1' to P4' to the adder 103 is at low level, and each of the signals P5' to P8' to the adder 104 is at high level at any instant in a first half period T/2 of the scan signals Pi', as shown in FIG. 12. Accordingly, the output signal X1 of the adder 103 has a level of 3e+Vcc, and the output signal X2 of the adder 104 has a level of 4e+Vcc.

At any instant in a second half period T/2, each of the signals P1' to P4' to the adder 103 is at high level, and one of the signals P5' to P8' to the adder 104 is at low level, as shown in FIG. 12. Accordingly, the signal X1 of the adder 103 is at a level of 4e+ Vcc, and the signal X2 of the adder 104 is at a level of 3e+Vcc.

Accordingly, in the first half period, the oscillation conditions of the third window comparator WC3 are met to provide the output signal Y1. In the second half period, the oscillation conditions of the fourth window comparator WC4 are met to provide the output signal Y2. As a result, in one scan period of the scan signals Pi' the window comparators WC3 and WC4 alternately generate the oscillation signals Y1 and Y2 as shown in FIG. 13.

While the window comparators WC3 and WC4 are alternately providing the signals Y1 and Y2, the level of the output Z1 of the third rectifier 105 is at a logical value 2, and the output Z2 of the fourth rectifier 106 is at a logical value 1. As a result, the oscillation conditions of the fifth window comparator WC5 are met to provide an oscillation output, which is rectified by the rectifier 107 and provided to the ON delay circuit 108.

Receiving the rectified output from the rectifier 107, the On delay circuit 108 holds it until scan signals Pi' of the next period are generated and then provides an output signal k. Similar to the previous failure detector, the output k has a logical value 1 indicating a high energy state if the scan circuit is normal.

An operation when the scan circuit is out of order will be explained.

If some of the scan signals P1' to P4' overlap at any low level instant during a first half period, the level of the output X1 of the third adder 103 will fall from 3e+Vcc to less than 2e+Vcc for the moment of overlapping. If any one of the scan signals P5' to P8' drops to low level during the first half period, the level of the output X2 of the fourth adder 104 will fall from 4e+Vcc to 3e+ Vcc for the moment of drop. Then, the oscillation conditions of the third window comparator WC3 are not met, and therefore, it temporarily stops the output Y1 for the moment.

If the same trouble occurs during a second half period, the fourth window comparator WC4 temporarily stops the output Y2 for the moment.

The time constant of the third rectifier 105 is set according to the scan period T, so that the output Z1 of the rectifier 105 is not always stopped even if the above trouble occurs. The time constant of the fourth rectifier 106, however, is set according to the oscillation frequency of the window comparators WC3 and WC4, so that the output Z2 of the rectifier 106 always stops for the moment of the trouble, to temporarily stop the output of the fifth window comparator WC5. If this is repeated in every scan period of the scan signals Pi', the On delay circuit 108 continuously provides an output k of logical value 0 due to the delay operation, thereby informing of the trouble.

If one of the scan signals Pi' is continuously generated, one of the outputs X1 and X2 of the adders 103 and 104 takes a level of 4e +Vcc instead of 3e+Vcc. Accordingly, one of the outputs Y1 and Y2 of the window comparators WC3 and WC4 takes a logical value 0. This results in temporarily stopping the output of the fifth window comparator WC5. If this state continues, the output k of the ON delay circuit 108 will be continuously at logical value 0 due to the delay operation, thereby informing of the failure.

If only the scan signals P1' to P4' sequentially fall to low level and if the scan signals P5' to P8' stay at high level, the oscillation conditions of the third window comparator WC3 are always satisfied, so that the output Y1 thereof will be always provided. On the other hand, the oscillation conditions of the fourth window comparator WC4 are not satisfied, so that the output Y2 thereof will not be provided. In this case, the output Z2 of the fourth rectifier 106 will always take a logical value 1 due to the output Y1 of the window comparator WC3. The output Z1 of the third rectifier 105, however, will not take a logical value 2 because only the output Y1 of the window comparator WC3 is provided to the rectifier 105 and the output Y2 of the window comparator WC4 is not provided thereto. As a result, the oscillation conditions of the fifth window comparator WC5 are not satisfied, and therefore, the window comparator WC5 provides no output signal. Accordingly, the output k of the On delay circuit 108 will take a logical value 0, to inform of the failure.

In a failure mode that one of the scan signals Pi' is not generated, the oscillation conditions of the third and fourth window comparators WC3 and WC4 are not satisfied, so that the output k of the ON delay circuit 108 takes a logical value 0, to thereby inform of the failure.

The above embodiment divides the scan signals Pi' into two groups each including four of the scan signals. This does not limit the present invention. For example, the scan signals may be divided into groups of three and five, or into groups of two and six.

Figure 16:
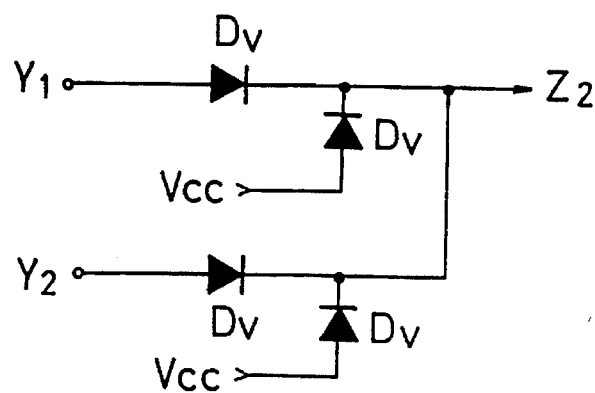
FIG. 16 shows still another rectifier in the failure detector.

If it is required to increase the output frequency f3 of the high-frequency signal generator 102, the coupling capacitor of the rectifier of FIG. 15 may be replaced with a variable capacitance diode, to form a circuit of FIG. 16. In FIG. 16, a mark Dv is the variable capacitance diode.

In FIG. 10, any one of the adders 103 and 104 provides an output level of 4e when four input signals are provided thereto and an output level of 3e when the four input signals provided thereto are not overlapping. Namely, the circuit of FIG. 10 checks every scan period half by half with use of the two adders 103 and 104. These adders detect according to the output level 4e that scan signals have been generated at least once in a scan period, and according to the output level 3e, that the scan signals are not overlapping.

Namely, the input terminal A, which detects the output level 3e, of each of the window comparators WC3 and WC4 provides a function of determining whether or not scan signals are overlapping, and the input terminal B, which detects the output level 4e, of each of the window comparators WC3 and WC4 provides a function of determining whether or not the scan signals halve been completely generated in each period. Each of the window comparators WC3 and WC4 provides an AND of results of these two functions.

If one of the scan signals P1' to P8' is not provided to the adders 103 and 104 and the other seven signals are always provided thereto, one of the oscillation outputs Y1 and Y2 of the window comparators WC3 and WC4 will be continuously provided. This kind of failure will occur when the AND gate GC1, for example, fails to provide the signal P1', while the remaining seven AND gates GC2 to GC8 continuously provide high-frequency signals. If this failure occurs, the rectifier 106 always provides the output signal Z2. On the other hand, the rectifier 105 does not provide an output of logical value 2. Accordingly, the window comparator WC5 does not oscillate. In this way, the rectifiers 105 and 106 deal with this sort of failure.

Figure 17:
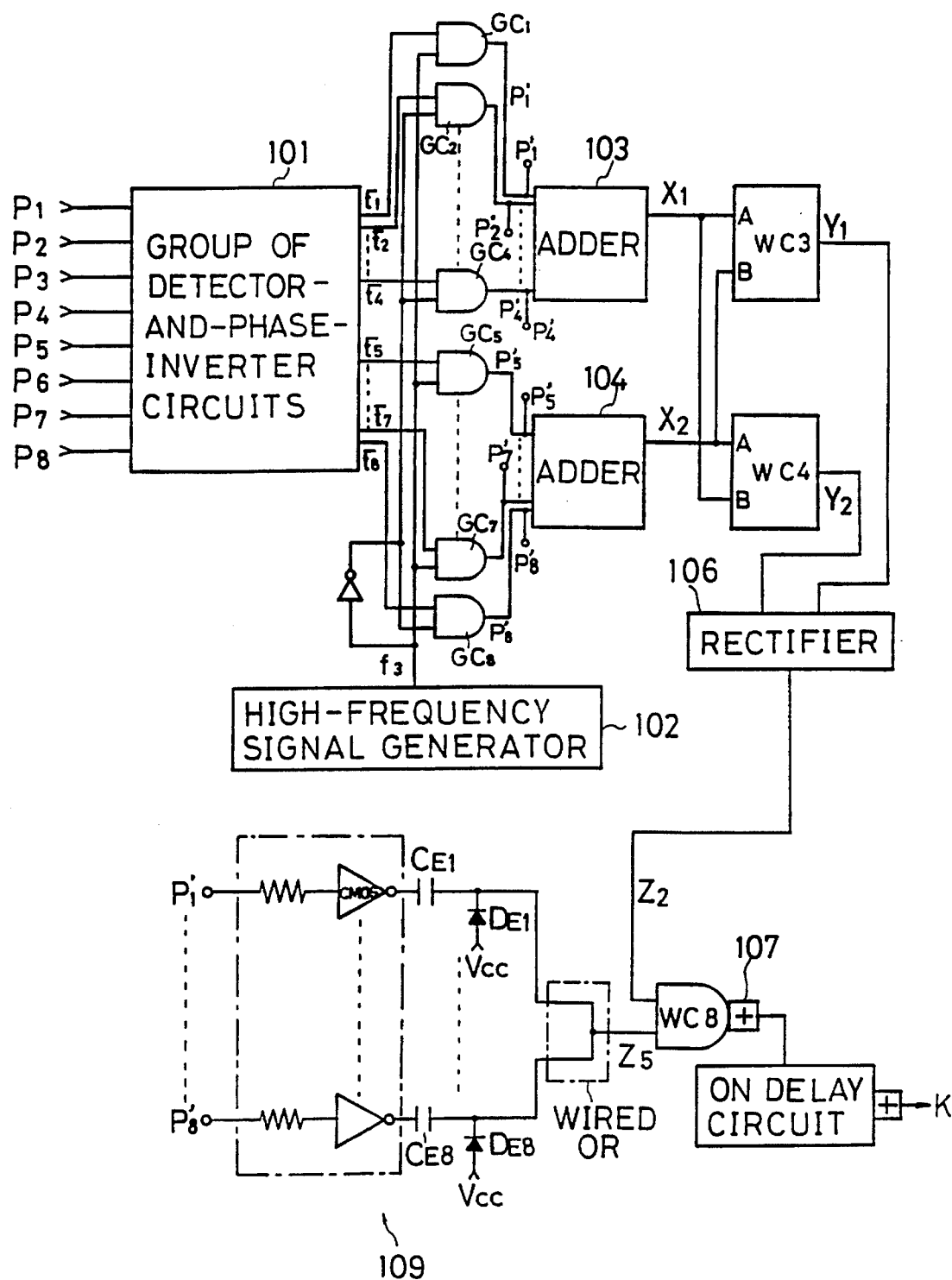
FIG. 17 shows a third example of a failure detector according to the present invention.

FIG. 17 shows a third example of a failure detector employing detector-and-phase-inverter circuits instead of the rectifier 105 and window comparator WC5 of the previous example. The detector-and-phase-inverter circuits detect a failure that AND gates GC1 to GC8 directly continuously generate high-frequency signals. In FIG. 17, the same reference marks as those of FIG. 10 represent like parts.

The example of FIG. 17 employs the detector-and-phase-inverter circuits of the type shown in FIG. 11(B) with CMOS circuits detecting and phase-inverting output signals Pi' provided by the AND gates GC1 to GC8, to reproduce rectangular signals t1 to t8. The example of FIG. 17 also employs coupling capacitors CEi (i=1 to 8) and diodes DEi (i=1 to 8) to add a source voltage Vcc to the rectangular signals ti. A wired-OR of the added results is supplied as an input signal Z5 to a 2-input window comparator WC8. The other input of the window comparator WC8 receives an OR of outputs of window comparators WC3 and WC4 as an output Z2 of a rectifier 106.

The detector-and-phase-inverter circuits, coupling capacitors CEi, and diodes DEi are prepared for the output signals Pi', respectively, to form a signal processor group 109. This group 109 detects and phase-inverts the respective modulated signals Pi' and overlap them with the source voltage Vcc.

When the rectangular signals t1 to t8 are normally and sequentially reproduced, the detector-and-phase-inverter circuits continuously provide output signals whose level is higher than that of the source voltage Vcc to the input terminal of the window comparator WC8. At this time, if the rectifier 106 provides an output Z2 of logical value 2 indicating normality, the window comparator WC8 provides an oscillation output to an ON delay circuit 108.

If any one of the AND gates GCi (i=1 to 8) fails and continuously generates a high-frequency signal, a corresponding one of the detector-and-phase-inverter circuits will not reproduce its own rectangular signal ti. Accordingly, the window comparator WC8 temporarily stops to oscillate for the moment. The ON delay circuit 108 samples and holds this stoppage.

In FIG. 17, the functions of the detector-and-phase-inverter circuits, capacitors CEi, and diodes DEi correspond to those of the rectifier 105 of FIG. 10. The function of the window comparator WC8 corresponds to that of the window comparator WC5 of FIG. 10.

The high-frequency signal generator 102 of FIGS. 10 and 17 has two objects. One is to employ the same adder as the first adder 31 of FIG. 6. The other is to make the time constant of the adder smaller to improve the responding speed of the adder.

If the scan period T of scan signals can be elongated and if the pulse width t (FIG. 12) of a scan signal can be relatively extended (if the number of optical axes of a multibeam sensor to be explained later can be made smaller), there will be no need to modulate the scan signals with the high-frequency signal through the AND gates GCi (i=1 to 8). Then, the failure detector can be simplified as shown in FIG. 18 and the adder as shown in FIG. 19.

Figure 18:
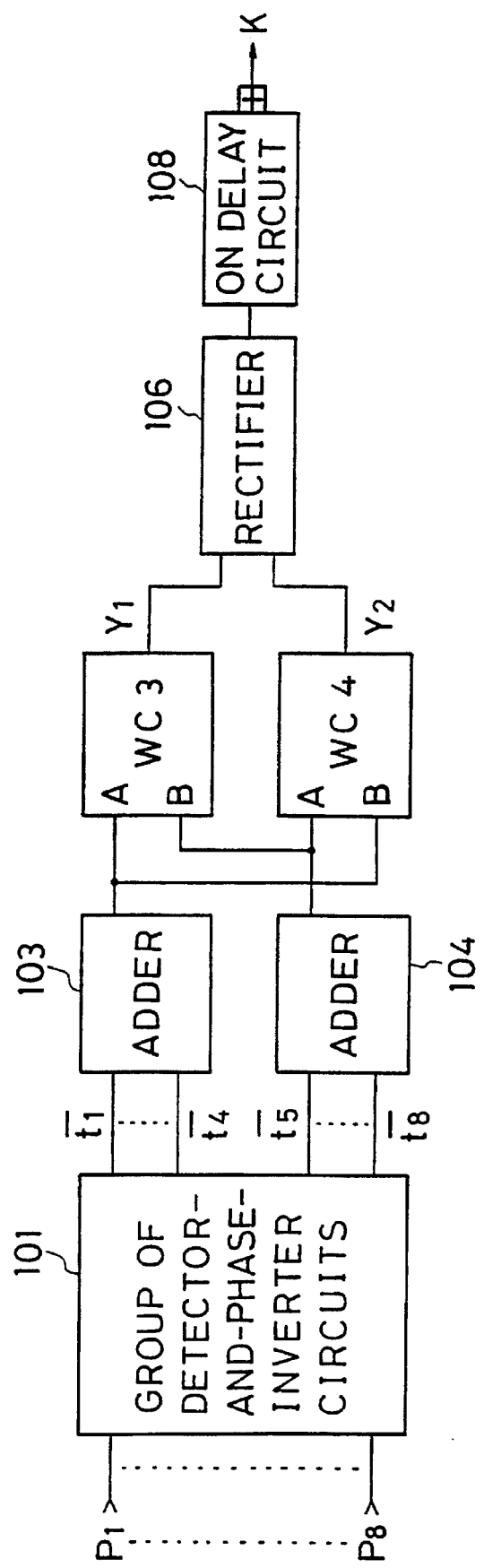
FIG. 18 shows a fourth example of a failure detector according to the present invention.
Figure 19:
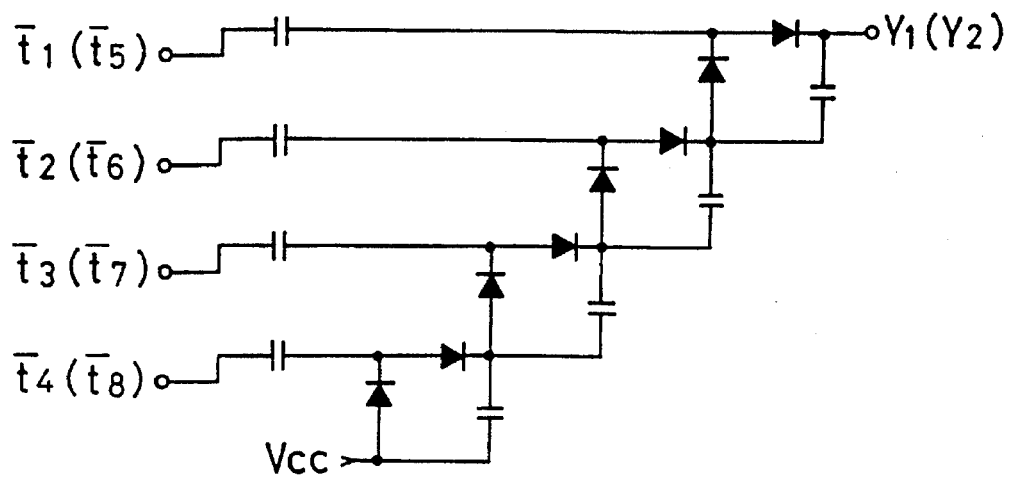
FIG. 19 shows an adder in the failure detector.

With reference to the simplified failure detector of FIG. 18 according to a fourth example, the principle of the failure detectors of FIGS. 10 and 17 will be again considered.

When some of input signals (scan signals) Pi (i=1 to 8) overlap, an output level of one of the adders 103 and 104 that must be 3e in a normal state falls below 3e. In this case, an output level of the other adder that must be 4e in the normal state will not always fall below 4e. Namely, if the scan signals are generated in a time band where the one output level is 3e, the other output level is maintained at 4e. Accordingly, the overlapping of the scan signals is detected by the input terminal A of the 2-input window comparator WC3 or WC4.

If any one of the scan signals Pi' (i=1 to 8) is not generated, the output levels of the adders 103 and 104 will be lower than 3e and 4e, respectively. Accordingly, if any one of the scan signals Pi is not generated in FIG. 18, the input terminal B of the 2-input window comparator WC3 or WC4 surely detects the lack of the scan signal because the adders are of alternating current coupling.

In FIGS. 10 and 17, a high-frequency signal is continuously generated if one of the scan signals Pi is not generated. To detect this, the output level 3e of the adders is detected with the window of Vcc+3e±Δe (e>Δe).

The function of detecting the overlapping of the scan signals Pi' is a first detecting function, and the function of detecting the lack of one of the scan signals Pi' is a second detecting function. Then, the 2-input window comparators WC3 and WC4 compute an AND of the two detecting functions and provide output signals Y1 and Y2, respectively. The rectifier 106 provides an OR of the signals Y1 and Y2, as shown in FIG. 15.

The signals Y1 and Y2, however, are generated at different timing, and if one of them is not generated, the output signal Z2 of the rectifier 106 will be at low level (logical value 0). Accordingly, the rectifier 106 actually functions as an AND circuit.

Consequently, the window comparators WC3 and WC4 and rectifier 106 of FIG. 18 form an AND circuit for the output levels 3e and 4e of the adders 103 and 104.

Differences in the characteristics of the failure detectors of FIGS. 6, 10, 17, and 18 will be explained.

If scan signals Pi and Pj (i is not equal to j) overlap and one of the coupling capacitors (CAi) for transmitting the scan signal Pi or Pj is broken, the output level of the adder 31 of FIG. 6 will not increase, and therefore, the output level will not be detected. If the same failures occur in FIGS. 10, 17, and 18, the output level 4e of one of the adders always drops, and therefore, a signal (logical value 0) indicating the abnormality is always provided.

A fifth example of a failure detector will be explained with reference to FIG. 20.

The failure detector 110 employs rectangular signals $\overline{ti}$ (i=1 to 8) for failure detection. These signals are of before modulation and may be detected and phase-inverted by the detector-and-phase-inverter circuit group 101 of FIG. 10. The rectangular signals $\overline{ti}$ are in synchronism with scan signals, and therefore, may be deemed as the scan signals. Similar to the failure detector 100 of FIG. 10, the signals ti are divided into two groups each including four of the signals. The groups are provided to fifth and sixth adders 111 and 112, respectively.

The adders 111 and 112 have the same configuration. Namely, each of the adders has four input terminals for receiving the rectangular signals $\overline{ti}$, respectively, and an output terminal. Between the input terminals and the output terminal, there are arranged capacitors C1 to C4 (C5 to C8), resistors R1 to R4 (R5 to R8) connected to the capacitors in series, respectively, and clamp diodes D1 to D4 (D5 to D8) for clamping the output side of the respective capacitors C1 to C4 to a predetermined voltage. Each one of the capacitors, resistors, and clamp diodes are connected together to form four circuits that are connected in parallel with one another. An output level of each of the adders 111 and 112 corresponds to the number of scan signals applied to the input terminals.

Output signals X3 and X4 of the adders 111 and 112 are supplied to first and second input terminals A and B of sixth and seventh window comparators WC6 and WC7 as shown in FIG. 20. The window comparators WC6 and WC7 are the same as the third and fourth window comparators WC3 and WC4 of FIG. 10.

More precisely, the input terminal A of the window comparator WC6 receives the output X3 of the adder 111, and the input terminal B thereof receives the output X4 of the adder 112. The input terminal A of the window comparator WC7 receives the output X4 of the adder 112, and the input terminal B thereof receives the output X3 of the adder 111.

Relationships between the outputs X3 and X4 of the fifth and sixth adders 111 and 112 are the same as those between the outputs X1 and X2 of the third and fourth adders 103 and 104 of FIG. 10.

When the output voltage level of one of the rectangular signals $\overline{ti}$ is, for example, 5 V, the output voltage level of the fifth adder 111 in a first half period is obtained by dividing the input voltage by the parallel combined resistance of the circuit that is receiving the rectangular signal $\overline{ti}$ and the resistance of the circuits that are not receiving the rectangular signal $\overline{ti}$. The output voltage level of the sixth adder 112 is 5 V. In a second half period, the output voltage level of the fifth adder 111 is 5 V, and the output voltage level of the sixth adder 112 is obtained by dividing the input voltage by the parallel combined resistance of the circuit that is receiving the rectangular signal and the resistance of the circuits that are not receiving the rectangular signal.

As the rectangular signals $\overline{ti}$ are sequentially, consecutively, and periodically generated, the outputs X3 and X4 of the fifth and sixth adders 111 and 112 alternately change their levels in every half period.

Conditions of an input signal Vin to oscillate the sixth and seventh window comparators WC6 and WC7 are set similar to those for the third and fourth window comparators WC3 and WC4 of FIG. 10.

Conditions for oscillating (giving a logical value 1 to) the output Y3 from the window comparator WC6 are that any one of the rectangular signals $\overline{t1}$ to $\overline{t4}$ is at low level and each of the rectangular signals $\overline{t5}$ to $\overline{t8}$ is at high level. On the other hand, conditions for oscillating the output Y4 of the window comparator WC7 are that each of the rectangular signals $\overline{t1}$ to $\overline{t4}$ is at high level and any one of the rectangular signals $\overline{t5}$ to $\overline{t8}$ is at low level.

The outputs Y3 and Y4 of the window comparators WC6 and WC7 are provided to fifth and sixth rectifiers 115 and 116, respectively. These rectifiers 115 and 116 are each the same as that of FIG. 15. The time constant of each of the rectifiers 115 and 116 is set according to a generation period of one of the rectangular signals $\overline{ti}$. In response to the signals Y3 and Y4, the rectifiers 115 and 116 provide outputs Z3 and Z4, respectively.

The outputs Z3 and Z4 are passed through a wired-OR circuit 117 whose output is provided to an ON delay circuit 118. The ON delay circuit 118 delays the output of the wired-OR circuit 117 by a scan period T or more and generates an output k.

The operation of the failure detector 110 of FIG. 20 will be explained.

Under a normal state, the scan signal generator sequentially and periodically generates eight scan signals Pi (i=1 to 8). The detector-and-phase-inverter circuit group 101 inverts the phases of the scan signals Pi and provide rectangular signals $\overline{ti}$ (i=1 to 8) as shown in FIG. 12. Four of the rectangular signals are provided to the fifth adder 111, and the remaining four are provided to the sixth adder 112.

When these rectangular signals $\overline{ti}$ are normal and sequential, one of the signals $\overline{t1}$ to $\overline{t4}$ to the adder 111 is at low level at any moment in a first half period T/2 of the signals $\overline{ti}$. At this moment, each of the other signals $\overline{t5}$ to $\overline{t8}$ to the adder 112 is at high level as shown in FIG. 12. At any moment in a second half period T/2, each of the signals $\overline{t1}$ to $\overline{t4}$ to the adder 111 is at high level, and one of the signals $\overline{t5}$ to $\overline{t8}$ to the adder 112 is at low level. In the first and second half periods, therefore, the outputs X3 and X4 of the adders 111 and 112 satisfy the oscillation conditions of the sixth and seventh window comparators WC6 and WC7. Consequently, the window comparators WC6 and WC7 alternately generate oscillation outputs Y3 and Y4 in the scan period of the rectangular signals $\overline{ti}$.

As a result, the fifth and sixth rectifiers 115 and 116 alternately generate outputs Z3 and Z4. The wired-OR circuit 117 then consecutively provides outputs each of logical value 1 to the ON delay circuit 118. The ON delay circuit 118 delays the output of the wired-OR circuit 117 until rectangular signals $\overline{ti}$ of the next period are generated. Then, the ON delay circuit 118 provides a rectified output k. The output k takes a logical value 1 corresponding to a high energy state only when the scan circuit is normal.

An operation when the scan circuit is out of order will be explained.

If some of the rectangular signals $\overline{ti}$ overlap or are missed for a moment, one of the output signals Y3 and Y4 of the window comparators WC6 and WC7 is not provided for the moment, similar to the failure detector 100 of FIG. 10. Accordingly, one of the output signals Z3 and Z4 of the rectifiers 115 and 116 stops for the moment, and therefore, the output of the wired-OR circuit 117 temporarily stops. If this is repeated in every scan period of the rectangular signals $\overline{ti}$, the ON delay circuit 118 will continuously provide an output k of logical value 0 due to its delay operation, to inform of the failure.

If one of the rectangular signals $\overline{ti}$ is continuously generated, a corresponding one of the capacitors Ci blocks the signal because the rectangular signals $\overline{ti}$ provided to the adders 111 and 112 of the failure detector 110 are unmodulated signals as shown in FIG. 12. Accordingly, the outputs Y3 and Y4 of the window comparators WC6 and WC7 surely stop, to thereby inform of the failure.

Examples of multibeam sensors according to the present invention employing the fail-safe scan circuit will be explained.

Figure 22:
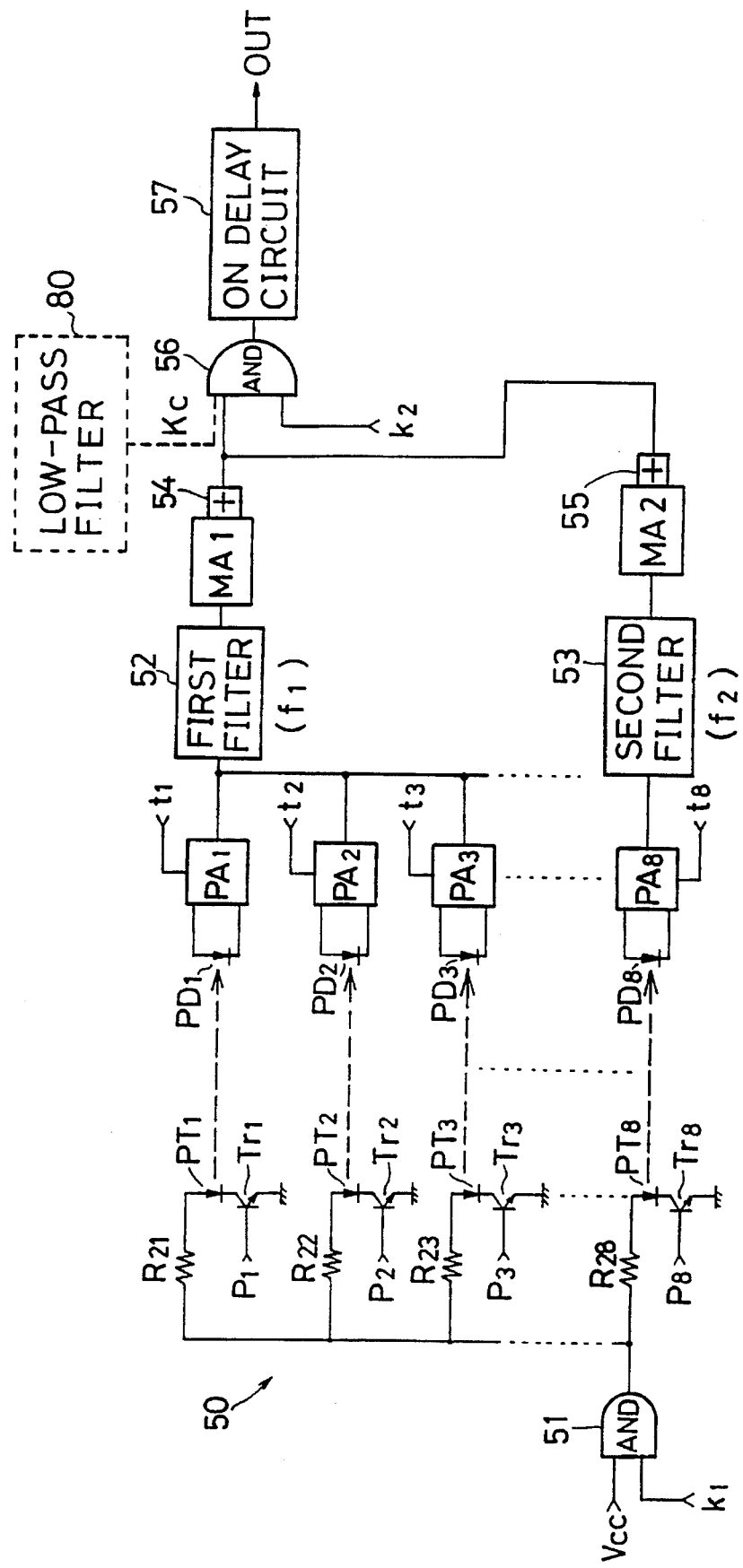
FIG. 22 shows the multibeam sensor of FIG. 21.

FIGS. 21 and 22 show a first example of a multibeam sensor.

The sensor includes a scan signal generator 40 (FIG. 21) having a fail-safe scan circuit and a sensor circuit 50 (FIG. 22) for detecting an object that may be present in front of the sensor.

The scan signal generator 40 has first and second fail-safe scan circuits 41 and 42 each having the failure detector mentioned above, a clock signal generator 43 for supplying a clock signal CK to the scan circuits 41 and 42, a reset signal generator 44 for supplying a reset signal RES to the scan circuits 41 and 42, and a high-frequency signal generator 45 for supplying a high-frequency signal of frequency f2 to the fail-safe scan circuit 41.

The first fail-safe scan circuit 41 provides scan signals Pi (i =1 to 8) to the bases of transistors Tri (i=1 to 8) of the sensor circuit 50. The signals to the transistors Tr1 to Tr7 are high-frequency signals of frequency f1. The signal to the last transistor Tr8 is a high-frequency signal of frequency f2.

When the first scan circuit 41 employs the failure detector 30 of FIG. 6, the high-frequency signal of frequency f2 is provided by connecting the high-frequency signal generator 45 instead of the inverter 23 to the AND gate GB8. When the first scan circuit 41 employs one of the failure detectors 100 and 110 of FIGS. 10 and 20, the high-frequency signal of frequency f2 is provided by connecting the high-frequency signal generator 45 to the AND gate GB8 having no inverter 23.

The second fail-safe scan circuit 42 generates rectangular signals ti (i=1 to 8), which are provided as power sources to preamplifiers PAi (i=1 to 8), respectively. The preamplifiers PAi are connected to photodetectors PDi (i=1 to 8), respectively, of the sensor circuit 50.

When the fail-safe scan circuits 41 and 42 employ each the failure detector 110 of FIG. 20, the scan circuit 41 on the light emitting side produces rectangular signals $\overline{ti}$ according to scan signals Pi and employs the signals $\overline{ti}$ as input signals to the failure detector thereof. On the other hand, the fail-safe scan circuit 42 on the light receiving side produces rectangular signals $\overline{ti}$ according to rectangular signals ti, which are provided for driving the preamplifiers PAi by the AND gate group 21, and employs the signals $\overline{ti}$ as input signals to the failure detector of the scan circuit 42.

Outputs k1 and k2 of the fail-safe scan circuits 41 and 42 correspond to the failure detecting outputs k of the failure detectors explained above.

The sensor circuit 50 of FIG. 22 includes light emitters PT1 to PT8 serving as objective devices to be scanned and driven by the scan signals Pi provided by the first fail-safe scan circuit 41 through the transistors Tr1 to TR8.

The sensor circuit 50 also includes the photodetectors PD1 to PD8 serving as objective devices to be driven. The photodetectors are arranged opposite to the light emitters PT1 to PT8, respectively, and are connected to the preamplifiers PA1 to PA8 that are driven by the rectangular signals t1 to t8 provided by the second fail-safe scan circuit 42. The photodetectors PD1 to PD8 are sequentially scanned and driven through the preamplifiers PA1 to PA8, to receive beams emitted from the light emitters PT1 to PT8.

An AND gate 51 computes an AND of the output k1 of the first fail-safe scan circuit 41 and a source voltage Vcc. The AND gate 51 serves as a fail-safe second AND circuit that provides no output if a failure occurs.

A first filter 52 receives a wired-OR of output signals of the preamplifiers PA1 to PA7 and extracts a signal of frequency f1.

A second filter 53 extracts a signal of frequency f2 from an output of the preamplifier PA8.

Main amplifiers MA1 and MA2 amplify outputs of the first and second filters 52 and 53, respectively.

Rectifiers 54 and 55 rectify outputs of the main amplifiers MA1 and MA2, respectively.

An AND gate 56 serves as a fail-safe first AND circuit for providing an AND of a wired-OR of outputs of the rectifiers 54 and 55 and the output k2 of the second fail-safe scan circuit 42.

An ON delay circuit 57 delays an output of the AND gate 56 for a predetermined time. The On delay circuit 57 has the same arrangement as the ON delay circuit 37 of the failure detector 30 of FIG. 6.

Reference marks R21 to R28 are resistors.

The operation of the multibeam sensor of FIGS. 21 and 22 will be explained.

According to the clock signal CK from the clock signal generator 43 and the reset signal RES from the reset signal generator 44, the first and second fail-safe scan circuits 41 and 42 simultaneously and periodically generate scan signals Pi (i=1 to 8) and rectangular signals ti (i=1 to 8). If the scan circuits 41 and 42 are normal, they provide outputs k1 and k2 each of logical value 1 to the AND gates 51 and 56, respectively. Accordingly, only when the scan circuit 41 is normal, the source voltage Vcc is supplied to the light emitters PTi (i=1 to 8). The source voltage Vcc sequentially scans the light emitters PT1 to PT8, which emit consecutive beams in synchronism with the scan signals P1 to P7 of frequency f1 and the scan signal P8 of frequency f2 from the first fail-safe scan circuit 41.

Meanwhile, the preamplifiers PA1 to PA8 for the photodetectors PD1 to PD8 are sequentially driven by the rectangular signals t1 to t8 from the second fail-safe scan circuit 42.

When the scan signals.. Pi from the scan circuit 41 are in synchronism with the rectangular signals ti from the scan circuit 42, beams emitted from the light emitters PT1 to PT7 are received by the corresponding photodetectors PD1 to PD7. Each received signal is passed through a corresponding one of the preamplifiers PAi, and a signal of frequency f1 is extracted by the first filter 52. The extracted signal is amplified by the main amplifier MA1 and rectified by the rectifier 54.

A beam from the light emitter PT8 is received by the photodetector PD8 and passed through the preamplifier PA8. The second filter 52 extracts a signal of frequency f2 from the preliminary amplified signal. The extracted signal is amplified by the main amplifier MA2 and rectified by the rectifier 55. A wired-OR of the outputs of the rectifiers 54 and 55 is supplied to the AND gate 56.

When these circuit are operating normally, the AND gate 56 receives signals each of logical value 1 corresponding to a high energy level and provides an output of logical value 1 to the ON delay circuit 57. After a predetermined delay time, the ON delay circuit 57 provides an output OUT to indicate that the sensor circuit 50 is normal.

If there is an object between the light emitters PTi and the photodetectors PDi, some of the photodetectors PDi will not provide outputs. Accordingly, the ON delay circuit 57 provides no output, to thereby inform of the presence of the object.

If some of the photodetectors PDi do not provide outputs in each scan period, the output of the ON delay circuit 57 maintains the logical value 0 because the delay time of the ON delay circuit 57 is longer than the scan period. Once the ON delay circuit 57 provides the output of logical value 0, a machine such as a press for which the multibeam sensor is installed is stopped and will not be restarted unless a switch is operated.

Since the light emitting frequency of the last light emitter PT8 differs from that of the other light emitters PT1 to PT7, the main amplifier MA2 provides no output if the light emitter PT8 is not in synchronism with the photodetector PD8. It is possible to determine whether or not the light emitter PT8 is in synchronism with the photodetector PD8 in every period.

When a plurality of the multibeam sensors are installed, the photodetector PD8 of the above arrangement is effective in providing no output in response to beams from adjacent multibeam sensors.

Figure 23:
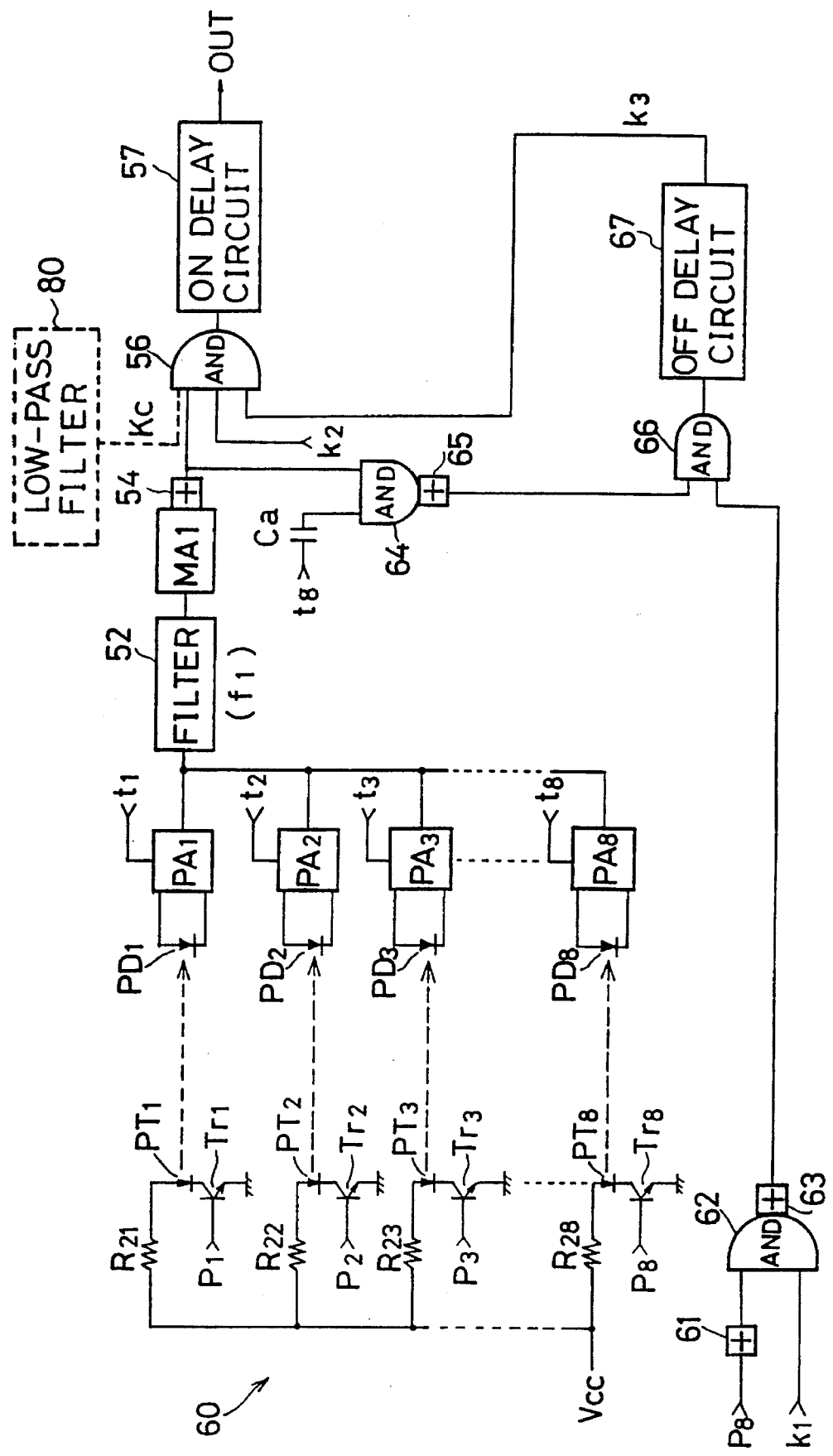
FIG. 23 shows a second example of a multibeam sensor according to the present invention.

FIG. 23 shows a sensor circuit 60 of a second example of a multibeam sensor according to the present invention. The sensor circuit 60 is combined with the scan signal generator 40 of FIG. 21.

In the sensor circuit 60, light emitters PTi (i=1 to 8) receive a source voltage Vcc and emit beams of the same frequency f1. Photodetectors PD1 to PD8 detect the beams, and a filter 57 extracts a signal of frequency f1 out of a wired-OR of the outputs of the photodetectors PDi. A rectifier 61 rectifies a scan signal P8 provided by the first fail-safe scan circuit 41 of FIG. 21. An AND gate 62 serves as a third AND circuit and has an input terminal for receiving a rectified output from the rectifier 61 and another input terminal for receiving an output signal k from the scan circuit 41. A rectifier 63 rectifies an output of the AND gate 62. A capacitor Ca prepares an AC coupled rectangular signal according to a rectangular signal t8 provided by the second fail-safe scan circuit 42 of FIG. 21 and provides it to an AND gate 64 serving as fourth AND circuit. The AND gate 64 also receives a rectified output of a main amplifier MA1. A rectifier 65 rectifies an output of the AND gate 64. An AND gate 66 serves as a fifth AND circuit and provides an AND of the rectifies outputs of the rectifiers 63 and 65. An OFF delay circuit 67 receives the output of the AND gate 66. An output k3 of the OFF delay circuit 67 is supplied to an AND gate 56.

Each of the AND gates 63, 64, and 66 has a fail-safe arrangement that generates no output when it fails, similar to the AND gates mentioned before.

Figure 24:
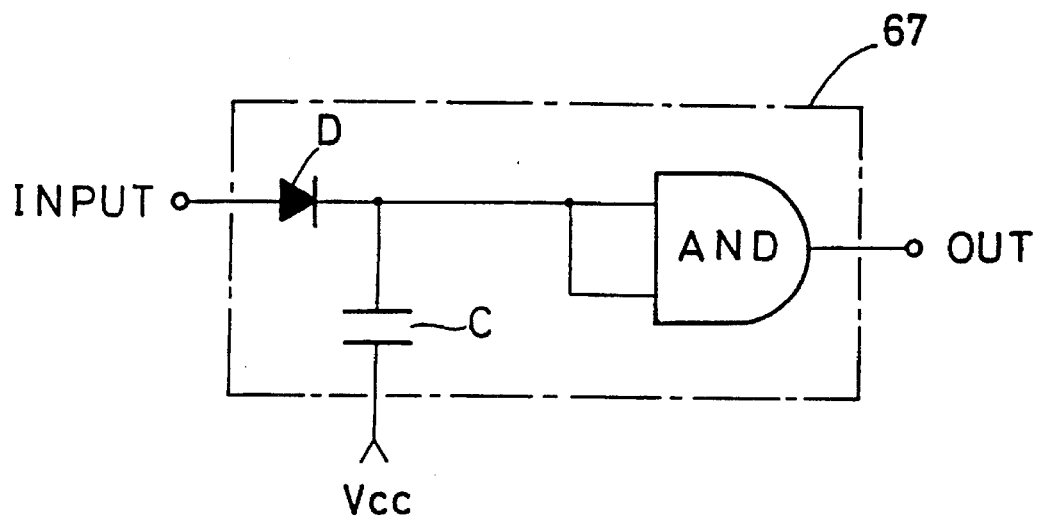
FIG. 24 shows an OFF delay circuit for the multibeam sensor of FIG. 23.

FIG. 24 shows the details of the OFF delay circuit 67. This circuit holds the output of the AND gate 66 that is periodically generated under a normal state, for at least one scan period. The OFF delay circuit 67 includes a fail-safe AND gate, a diode D, and a capacitor C. The diode D and capacitor C are disposed on the input side of the AND gate.

In the sensor circuit 60, the OFF delay circuit 67 provides an output of logical value 1 only when the light emitter PT8 is in synchronism with the photodetector PD8. When it is completely normal, the AND gate 56 provides an output, and an ON delay circuit 57 provides an output to inform that the sensor circuit 60 is normal.

This sensor 60 does not require the second filter 53 and main amplifier MA2 of FIG. 22.

FIG. 25 shows a sensor circuit 70 of a third example of a multibeam sensor according to the present invention. The sensor circuit 70 is combined with the scan signal generator 40 of FIG. 21.

In the sensor circuit 70, an output of a preamplifier PA8 is independent of the other preamplifiers PAi to PA7. The sensor circuit 70 has a second filter 53, a main amplifier MA2, and a rectifier 55. An AND gate 66 provides an AND of an output of the rectifier 55 and a rectified output of an AND gate 62 to an OFF delay circuit 67, which provides an output k3. An AND gate 56 receives the output k3, a rectified output of a main amplifier MA1, and an output k2 of the second fail-safe scan circuit 42 of FIG. 21.

Only when the last light emitter PT8 is in synchronism with the last photodetector PD8 in each scan period and only when scan outputs for driving the light emitters PT1 to PT8 are normal, an ON delay circuit 57 provides an output to inform that the sensor circuit 70 is normal.

When the frequency of the clock signal CK in the scan signal generator 40 of FIG. 21 becomes extremely high, the failure detector in each of the fail-safe scan circuits 41 and 42 may overlook missed scan signals.

Figure 26:
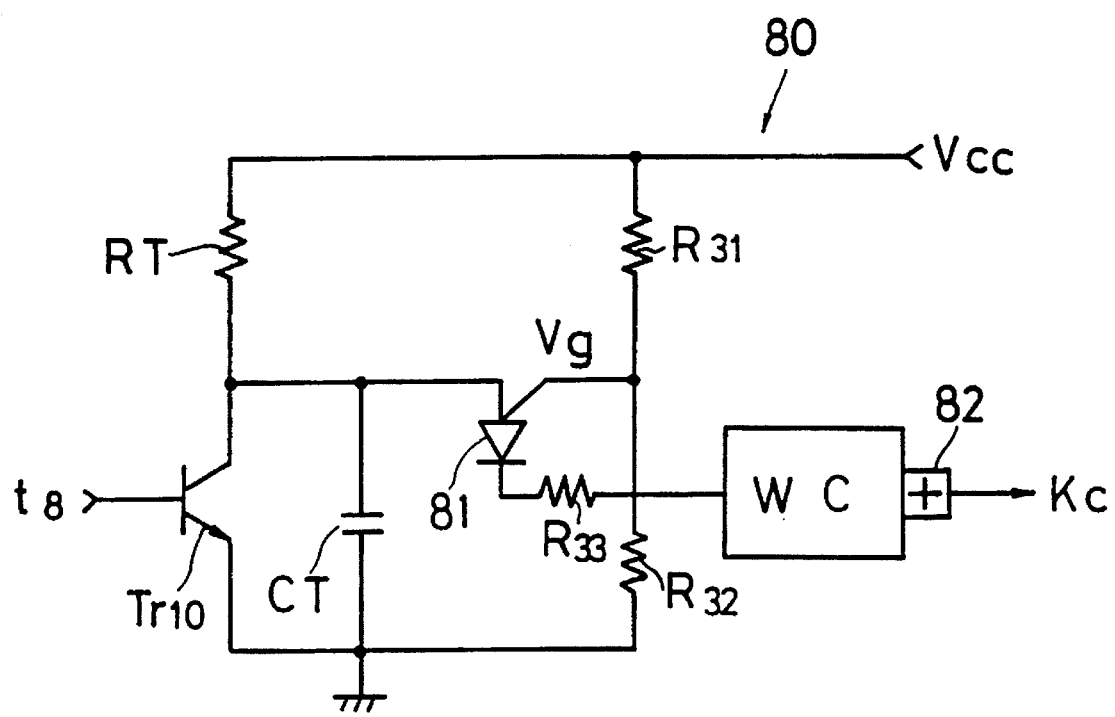
FIG. 26 shows a low-pass filter for the multibeam sensor of the present invention.

To solve this problem, a low pass filter 80 of FIG. 26 may be employed. When the frequency of the clock signal CK exceeds a predetermined value, the low-pass filter 80 provides an output Kc of logical value 0 to the AND gate 56 of the sensor circuits 50, 60, and 70 of FIGS. 22, 23, and 25. When the frequency of the clock signal exceeds the predetermined value, it is determined to be abnormal, and the AND gate 56 provides no output.

The low-pass filter 80 of FIG. 26 will be explained in detail.

The low-pass filter 80 has a programmable unijunction transistor (hereinafter referred to as the PUT) 81, a transistor Tr10 whose base receives a rectangular signal t8 related to the frequency of the clock signal CK, a resistor RT and a capacitor CT that set the oscillation time constant of the PUT 81 such that the PUT 81 provides an oscillation output when the frequency of the rectangular signal t8 is lower than the predetermined value, voltage dividing resistors R31 and R32 for dividing a source voltage Vcc into a gate voltage Vg to turn ON the PUT 81, a fail-safe window comparator WC similar to the one shown in FIG. 7, receiving an output of the PUT 81 through a resistor R33, and a rectifier 82 for rectifying an output of the window comparator WC. The output Kc of the rectifier 82 is a signal for monitoring the frequency of the rectangular signal t8 and is provided to the AND gate 56.

The operation of the low-pass filter 80 will be explained.

When the transistor Tr10 is OFF, the capacitor CT is gradually charged to the source voltage Vcc through the resistor RT. When the charged voltage of the capacitor CT exceeds the gate voltage Vg, which is determined by the voltage dividing value of the resistors R31 and R32, the PUT 81 turns ON to provide an oscillation pulse, which is supplied to the window comparator WC. When the transistor Tr10 turns ON in response to the rectangular signal t8 and when the anode side of the PUT 81 is short-circuited to a ground, the PUT 81 again turns OFF. Repetition of these operations causes the PUT 81 to provide oscillation pulses.

When the frequency of the rectangular signal t8 to the transistor Tr10 is within the allowable range, the capacitor CT is sufficiently charged higher than the gate voltage Vg after the transistor Tr10 is turned ON by a rectangular signal t8 of a given period until the transistor Tr10 is again turned ON by a rectangular signal t8 of the next period. Accordingly, the PUT 81 provides oscillation pulses.

When the frequency of the rectangular signal t8 is higher than the allowable range, the capacitor CT is not charged higher than the gate voltage Vg after the transistor Tr10 is turned ON by a rectangular signal t8 of a given period until the transistor Tr10 is again turned ON by a rectangular signal t8 of the next period. Then the charged voltage of the capacitor CT is discharged due to the ON operation of the transistor Tr10 before the PUT 81 becomes conductive. Consequently, the PUT 81 provides no oscillation pulses.

As a result, the output of the window comparator WC is stopped when the frequency of the rectangular signal t8, i.e., the frequency of the clock signal CK exceeds the predetermined value. Then, the rectifier 82 does not provide the output Kc. Namely, the rectifier 82 provides an output of logical value 0. This results in stopping the output of the AND gate 56, to inform of the abnormality.

When any one of the resistors RT, R31, R32, and R33 is broken, or when the capacitor CT, transistor Tr10, or PUT 81 is broken or short-circuited, the PUT 81 provides no oscillation pulses. When the breakage of the capacitor CT and the short circuit of the PUT 81 simultaneously occur, a lower limit of the level decision range of the window comparator WC becomes higher than the source voltage Vcc due to the input impedance of the window comparator WC and the resistor RT, so that the window comparator WC provides no output. In this way, the low-pass filter 80 is a fail-safe circuit that provides no output in any failure.

We claim:

1. A fail-safe circuit for sequentially and periodically driving and scanning objective devices, comprising:

a counter circuit for periodically counting as many pulses of an input clock signal as the objective devices;

a scan signal generator for consecutively generating as many scan signals as the objective devices in response to count signals provided by the counter circuit; and a fail-safe failure detector for generating a signal of logical value 1 corresponding to a high energy state if the scan signals are normal, and a signal of logical value 0 corresponding to a low energy state to indicate an abnormality not only when some of the scan signals overlap or at least one of the scan signals is missed in a scan period but also when some of the scan signals overlap and at least one of the scan signals is missed in a scan period, the fail-safe failure detector having;

a first detective function unit involving a first adder, for determining whether or not some of the scan signals are overlapping according to an output of the first adder, and if they are overlapping, providing a signal of logical value 0 to indicate the abnormality;

a second detective function unit for determining whether or not all scan signals to be generated in a scan period have been completely generated, and if at least one of them has not been generated, providing a signal of logical value 0 to indicate the abnormality;

an AND circuit for providing an AND of the outputs of the first and second detective function units; and an ON delay circuit for providing a signal of logical value 1 to indicate that the scan signals are normal a delay time, which is longer than the scan period, after receiving a signal of logical value 1 from the AND circuit, the first adder of the first detective function unit having:

input terminals for receiving the scan signals, respectively, the scan signals being sequentially generated by the scan signal generator with any adjacent two of them having a phase difference of $\pi$;

capacitors series-connected to the input terminals, respectively, for transmitting the scan signals to an output terminal and smoothing scan signals of the next scan period;

clamp diodes provided for the capacitors, respectively, to clamp outputs of the capacitors to a predetermined voltage;

a clamp diode for clamping the output terminal to the predetermined voltage; and a smoothing capacitor for smoothing a voltage appearing at the output terminal, the first adder doubling, rectifying and summing up the voltages of the scan signals with a charge/discharge time constant for the voltage doubling and rectifying processes being set according to a period of a scan signal.

2. The fail-safe scan circuit according to claim 1, wherein the scan signal generator has:

a first group of AND gates of the same number as the objective devices, for consecutively generating rectangular signals according to the count signals from-the counter circuit;

a high-frequency signal generator for always generating a high-frequency signal;

an inverter for inverting the high-frequency signal; and a second group of AND gates of the same number as the objective devices, a first input terminal of each of the AND gates receiving a corresponding one of the rectangular signals, a second input terminal of every other one of the AND gates receiving the high-frequency signal and a second input terminal of each of the remaining AND gates receiving the inverted high-frequency signal, each of the AND gates of the second group providing the non-inverted or inverted high-frequency signal as a scan signal if the rectangular signal represents a logic value 1.

3. The fail-safe scan circuit according to claim 1, wherein the first detective function unit of the failure detector has:

The first adder;

a first window comparator for providing a signal of logical value 1 if the output level of the first adder is substantially equal to the voltage doubled and rectified level of a scan signal; and a first rectifier for rectifying an output signal of the first window comparator and providing the rectified signal to the AND circuit.

4. The fail-safe scan circuit according to claim 1, wherein the second detective function unit has:

a second adder for doubling, rectifying, and summing up the voltages of the scan signals with a charge/discharge time constant for the voltage doubling and rectifying processes being set according to a period of a complete set of the scan signals;

a second window comparator for providing a signal of logical value 1 if the output level of the second adder is substantially equal to the sum of the voltage doubled and rectified levels of the scan signals of a scan period; and a second rectifier for rectifying an output signal of the second window comparator and providing the rectified signal to the AND circuit.

5. A fail-safe scan circuit for sequentially and periodically driving and scanning objective devices, comprising:

a counter circuit for periodically counting as many pulses of an input clock signal as the objective devices;

a scan signal generator for consecutively generating as many scan signals as the objective devices in response to count signals provided by the counter circuit; and a fail-safe failure detector for generating a first signal of logical value 1 corresponding to a high energy state if the scan signals are normal, and a second signal of logical value 0 corresponding to a low energy state to indicate an abnormality not only when some of the scan signals overlap at least one of scan signals is missed in a scan period but also when some of the scan signals overlap and at least one of the scan signals is missed in a scan period, the fail-safe failure detector providing the second signal of logical value 0 if at least one of the scan signals is abnormal and the failure detector itself is out of order.

6. The fail-safe scan circuit according to claim 5, wherein the failure detector has:

a group of detector-and-phase-inverter circuits of the same number as the scan signals, for detecting and phase-inverting the scan signals;

third and fourth adders for summing up the output levels of respective groups of the phase-inverted high-frequency modulated scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value I only when the sums are within the respective ranges set for the third window comparator;

a third rectifier for rectifying the output signals of the third and fourth window comparators and providing a signal whose level is the sum of the levels of the output signals of the third and fourth window comparators only when the output signals of the third and fourth window comparators are normal and alternating, a time constant of the third rectifier being set according to a period of a complete set of the scan signals;

a fourth rectifier for rectifying the output signals of the third and fourth window comparators and providing a signal of logical value 1 if at least one of the third and fourth window comparators provides an output signal, and a signal of logical value 0 if none of the third and fourth window comparators provide an output signal, a time constant of the fourth rectifier being set according to a period of a scan signal;

a fifth window comparator for providing a signal of logical value 1 only when the output level of the third rectifier is substantially equal to the sum of the output levels of the third and fourth window comparators and the fourth rectifier provides a signal of logical value 1; and an ON delay circuit for providing a signal of logical value 1 to indicate that the scan signals are normal a delay time, which is longer than the scan period, after receiving a signal of logical value 1 from the fifth window comparator.

7. The fail-safe scan circuit according to claim 5, wherein the failure detector has:

a group of detector-and-phase-inverter circuits of the same number as the scan signals, for detecting and phase-inverting the scan signals;

third and fourth adders for summing up the output levels of respective groups of the detected and phase-inverted scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value 1 only when the sums are within the respective ranges set for the third window comparator;

a fourth rectifier for rectifying the output signals of the third and fourth window comparators and providing a signal of logical value 1 if at least one of the third and fourth window comparators provides an output signal, and a signal of logical value 0 if none of the third and fourth window comparators provide an output signal, a time constant of the fourth rectifier being set according to a period of a scan signal; and an ON delay circuit for providing a signal of logical value 1 to indicate that the scan signals are normal a delay time, which is longer than the scan period, after receiving a signal of logical value 1 from the fourth rectifier.

8. The fail-safe scan circuit according to claim 5 wherein the failure detector has:

a group of detector-and-phase-inverter circuits of the same number as the scan signals, for detecting and phase-inverting the scan signals;

fifth and sixth adders each having as many input terminals as the detected and phase-inverted scan signals contained in a corresponding one of the groups of the scan signals, each of the fifth and sixth adders including circuits connected in parallel with one another between the input terminals and an output terminal, each circuit having a capacitor, a resistor connected in series with the capacitor, and a clamp diode for clamping an output of the capacitor to a predetermined voltage, each of the fifth and sixth adders providing an output signal whose voltage level is determined by the number of the scan signals applied to the input terminals of the adder;

a sixth window comparator having a first input terminal for receiving a sum provided by the fifth adder and a second input terminal for receiving a sum provided by the sixth adder, the sixth window comparator providing a signal of logical value 1 only when the sums are within respective predetermined ranges that are different from each other and are determined according to the numbers of the scan signals in the respective groups;

a seventh window comparator having a first input terminal for receiving the sum from the sixth adder and a second input terminal for receiving the sum from the fifth adder, the seventh window comparator providing a signal of logical value 1 only when the sums are within the respective ranges set for the sixth window comparator;

fifth and sixth rectifiers for rectifying the output signals of the sixth and seventh window comparators, respectively, a time constant of the rectifiers being set according to a period of a scan signal;

an OR circuit for providing an OR of the rectified outputs of the fifth and sixth rectifiers; and an ON delay circuit for providing a signal of logical value 1 to indicate that the scan signals are normal a delay time, which is longer than the scan period, after receiving a signal of logical value 1 from the OR circuit, 9. The fail-safe scan circuit according to claim 5, wherein the failure detector has:

a group of detector-and-phase-inverter circuits of the same number as the scan signals, for detecting and phase-inverting the scan signals;

third and fourth adders for summing up the output levels of respective groups of the phase-inverted high-frequency-modulated scan signals;

a third window comparator having a first input terminal for receiving the sum from the third adder and a second input terminal for receiving the sum from the fourth adder, the third window comparator providing a signal of logical value 1 only when the sums are within respective predetermined ranges that are different from each other and are determined according to the numbers of the scan signals in the respective groups;

a fourth window comparator having a first input terminal for receiving the sum from the fourth adder and a second input terminal for receiving the sum from the third adder, the fourth window comparator providing a signal of logical value 1 only when the sums are within the respective ranges set for the third window comparator;

a fourth rectifier for rectifying the output signals of the third and fourth window comparators and providing a signal of logical value 1 if at least one of the third and fourth window comparators provides an output signal, and a signal of logical value 0, if none of the third and fourth window comparators provide an output signal, a time constant of the fourth rectifier being set according to a period of a scan signal;

a group of signal processors of the same number as the phase-inverted high-frequency modulated scan signals, for further detecting and phase-inverting the phase-inverted high-frequency modulated scan signals and then adding these signals to a source voltage;

an eighth window comparator for providing an output of logical value 1 when the fourth rectifier provides a signal of logical value 1 and a wired-OR of outputs of the signal processors is a logical value 1; and an ON delay circuit for providing a signal of logical value 1 to indicate that the scan signals are normal a delay time, which is longer than the scan period, after receiving a signal of logical value 1 from the eighth window comparator.

10. A multibeam sensor employing:

first and second fail-safe scan circuits defined in claim 1 driven by a common clock signal, said first fail-safe scan circuit generating high frequency scan signals and said second fail-safe scan circuit generating rectangle signals;

light emitters connected to said first fail-safe scan circuit and sequentially driven by the high-frequency scan signals, which are sequentially provided by the first fail-safe scan circuit, and emitting beams;

photodetectors arranged opposite to the light emitters, respectively, each of the photodetectors providing a signal of logical value 1 when receiving a beam from a corresponding one of the light emitters;

amplifiers connected to said second fail-safe scan circuit and provided for the photodetectors, respectively, for amplifying outputs of the corresponding photodetectors producing amplified outputs, the amplifiers being driven by the respective rectangular signals sequentially provided by the second fail-safe scan circuit in synchronism with the scan signals from the first fail-safe scan circuit;

a first AND circuit for providing an AND operation of a first output of an OR operation of the amplified outputs of the amplifiers with a second output of a failure detector of the second fail-safe scan circuit; and an ON delay circuit for providing a signal of logical value 1 for a delay time, which is longer than a scan period of the scan signals, after receiving the signal of logical value 1 from the first AND circuit.

11. The multibeam sensor according to claim 10, further comprising a low-pass filter that provides an output signal of logical value 0 when the frequency of the common clock signal to the first and second fail-safe scan circuits exceeds a predetermined value, the output signal of the low-pass filter being provided to the first AND circuit.

12. The multibeam sensor according to claim 11, wherein the low-pass filter has:

a programmable unijunction transistor;

voltage dividing resistors for dividing a source voltage, to form a gate voltage of the programmable unijunction transistor;

a resistor connected in series between the source voltage and an anode of the programmable unijunction transistor;

a capacitor connected in parallel with the programmable unijunction transistor, the capacitor and resistor setting an oscillation time constant of the programmable unijunction transistor;

a transistor connected in parallel with the capacitor, having a collector connected to a node between the capacitor and the resistor, an emitter connected to a ground and a base receiving a signal correlated to the clock signal;

a window comparator for determining a threshold of an oscillation output of the programmable unijunction transistor; and a rectifier for rectifying an output of the window comparator.

13. The multibeam sensor according to claim 10, wherein a scan signal provided by the first fail-safe scan circuit to the last one of the light emitters has a different frequency from the other scan signals provided by the same scan circuit to the other light emitters, and wherein the multibeam sensor further comprises:

a first filter for receiving an OR of amplified output signals from the photodetectors corresponding to the other light emitters and extracting a signal having the same frequency as the scan signals applied to the other light emitters; and a second filter for receiving an amplified output from the photodetector corresponding to the last light emitter and extracting a signal having the same frequency as the scan signal applied to the last light emitter, an OR of the output signals of the first and second filters being provided to the first AND circuit.

14. The multibeam sensor according to claim 10, further comprising a second AND circuit for providing an AND of an output of the failure detector of the first fail-safe scan circuit and a power source applied to the light emitters, an output of the second AND circuit being applied as a power source to the light emitters.

15. The multibeam sensor according to claim 10, further comprising:

a third AND circuit for providing an AND of a signal provided by the failure detector of the first fail-safe scan circuit and the last one of scan signals generated in a scan period;

a fourth AND circuit for providing an AND of an OR of amplified outputs provided by the amplifiers of the photodetectors and the last one of rectangular signals generated in the scan period by the second fail-safe scan circuit;

a fifth AND circuit for providing an AND of output signals of the third and fourth AND circuits; and an OFF delay circuit for stopping to provide a signal of logical value 1 a delay time, which is longer than the scan period, after the fifth AND circuit stops to provide a signal of logical value 1, an output of the OFF delay circuit being provided to the first AND circuit.

* * * * *